US012623213B2

(12) United States Patent
Wachinger et al.

(10) Patent No.: US 12,623,213 B2
(45) Date of Patent: May 12, 2026

(54) FLUIDIC SYSTEM AND CORRESPONDING METHOD

(71) Applicants: Dionex Softron GmbH, Germering (DE); Thermo Fisher (Shanghai) Instruments Co., Ltd., Shanghai (CN)

(72) Inventors: Thomas Wachinger, Altomuenster (DE); Zhicheng Zhang, Shanghai (CN); Hongfang Wang, Shanghai (CN); Yongqiang Li, Shanghai (CN)

(73) Assignees: Dionex Softron GmbH, Germering (DE); Thermo Fisher (Shanghai) Instrument Co., Ltd., Shanghai (CN)

( * ) Notice: Subject to any disclaimer, the term of this patent is extended or adjusted under 35 U.S.C. 154(b) by 430 days.

(21) Appl. No.: 17/933,030

(22) Filed: Sep. 16, 2022

(65) Prior Publication Data

US 2023/0173480 A1 Jun. 8, 2023

(30) Foreign Application Priority Data

Sep. 22, 2021 (CN) .......................... 202111106132.9

(51) Int. Cl.
*B01L 3/00* (2006.01)

(52) U.S. Cl.
CPC ....... *B01L 3/502* (2013.01); *B01L 2400/0475* (2013.01); *B01L 2400/0622* (2013.01); *B01L 2400/086* (2013.01)

(58) Field of Classification Search
CPC ............. B01L 3/502; B01L 2400/0475; B01L 2400/0622; B01L 2400/086; B01D 15/247; B01D 15/10; G01N 30/80
See application file for complete search history.

(56) References Cited

U.S. PATENT DOCUMENTS 10,746,708 B2 * 8/2020 Olovsson ............... G01N 30/20
2013/0067997 A1 3/2013 Ebsen et al.
(Continued)

FOREIGN PATENT DOCUMENTS

CN 104903721 A 9/2015
CN 111505173 A 8/2020
(Continued)

OTHER PUBLICATIONS

Extended European Search Report from European Application No. 22196977.7, dated Feb. 2, 2023, 7 pages.
(Continued)

*Primary Examiner* — Angelisa L. Hicks
(74) *Attorney, Agent, or Firm* — Klarquist Sparkman, LLP

(57) ABSTRACT

A fluidic system for fraction collection comprises a switching valve having a plurality of ports for connecting first and second ports in different configurations. An inlet line is directly connected to the first port, and a collection device is directly connected to the second port. In a collection configuration, the first port and the second port are connected. The ports further comprise third and fourth ports, and the fluidic system further comprises a buffer section directly connected to the third and fourth ports. The fluidic system further comprises a first collection reservoir and is configured to position the collection device to expel a fluid into the first collection reservoir. In a buffer configuration, fluid flows through the inlet line, the first port, the third port, the buffer section, the fourth port, the second port, and the collection device.

12 Claims, 15 Drawing Sheets

(56) References Cited

U.S. PATENT DOCUMENTS

| | | | | |
|---|---|---|---|---|
| 2015/0246296 | A1 | 9/2015 | Burnett et al. | |
| 2017/0343520 | A1* | 11/2017 | Ortmann ................ | G01N 30/04 |
| 2019/0212231 | A1 | 7/2019 | Wan et al. | |

FOREIGN PATENT DOCUMENTS

| | | | |
|---|---|---|---|
| WO | 2009059286 | A9 | 5/2009 |
| WO | 2020084334 | A1 | 4/2020 |

OTHER PUBLICATIONS

Chinese Office Action from CN Application No. 202111106132.9, dated Feb. 18, 2024, 4 pages.

* cited by examiner

FLUIDIC SYSTEM AND CORRESPONDING METHOD

CROSS-REFERENCE TO RELATED APPLICATIONS

This application claims priority from China Application No. 202111106132.9, filed on Sep. 22, 2021, which application is incorporated herein by reference in its entirety.

TECHNICAL FIELD

The present invention relates to a fluidic system and a method for fraction collection that may be used, at least as a part, in a liquid chromatography system, preferably in a High Performance Liquid Chromatography (HPLC) system. More particularly, it relates to a flush function and a switching valve configured to be used in a fluidic system for fraction collection.

BACKGROUND

Chromatographic systems are widely used for separating a sample into its various components. More particularly, chromatography is a group of analytical methods for taking a sample (for e.g., a complex mixture) and separating its component substances, or analytes, from one another. In general, analytical chromatography is used to determine the existence, and sometimes the concentration, of analytes in a sample.

SUMMARY

Some components, that may be called fractions, separated from a sample may need further sample handling, such as separation and analysis. They may then be collected into target vessels as separated fractions. Embodiments of the present invention relate to a fraction collector, which is a device of a fluidic system, preferably an HPLC system, to collect those target fractions. It may be appreciated that without collection of fractions, chromatography may only yield information on the composition of a sample but may not help to separate the different components. Fraction collection may thus form a part of most chromatographic separation processes. Separation of components may be of interest, for example, in purification of samples, or in chemical testing of different components of a sample, that may be particularly advantageous for medical applications.

In a liquid chromatography system, a sample to be analyzed is pushed by an analytical pump through a separation column with the help of a solvent (that may be called a mobile phase). The separation column may be filled with an adsorbent material (that may be called a stationary phase) that may interact with the component molecules of the sample. Depending on the strength of interaction of different components present in the sample with the stationary phase, they are eluted from the separation column at different times. They may then be detected by a detector downstream of the separation column as peaks at different times, with strongly interacting components eluting as peaks later in time than weakly interacting components.

As described above, it may be advantageous to collect the fractions eluted from the separation column downstream of the detector for further analysis. For example, the sample may comprise a plurality of components that all interact weakly with a first stationary phase in the separation column. A mixture of these components may then be eluted relatively early in the separation process. It may then be advantageous to repeat the separation process with a different stationary phase to allow for further analysis of this mixture that interacted only weakly with the first stationary phase. This may be of particular advantage in cases where only a limited volume of sample may be used for analysis and fractions may be collected from a first separation to conserve the volume of sample.

Collection of fractions may be based on the detector signal, for example, on the identification of certain peaks, or on retention times in the separation column, for example, collection of a fraction that is eluted from the separation column between some start time and end time. These may be classified as peak-based and time-based fractionation, respectively. Time-based fractionation may be advantageously employed when the fractions to be collected have known, stable retention times or known, stable peak shapes such that a start and stop of the fraction collection process may be based on, for example, a slope of the peak shape. It may also be particularly advantageous for complex samples, where accurate differentiation between peaks may be difficult so that a peak-based method may yield inaccurate collection. However, time-based fractionation may provide low resolution as all the components that may be eluted in the time window chosen for collection will be collected in the fraction.

Peak-based fractionation, on the other hand, may be advantageous when retention times and/or peak shapes are not known or are unstable. However, it may provide higher resolution than time-based fractionation, since only known peaks are collected as fractions.

A relevant consideration for fraction collecting systems, that may be called fraction collectors, may be minimization of fluid volume lost to waste when switching reservoirs for collecting more than one fraction, for example. Another consideration may be the purity of fractions collected, for example, for fractions that may be closely spaced in the separation process. An example of mixing may be a carry-over which may result from incomplete emptying of a collection needle (for example) at the end of collecting a previous fraction.

In view of the above, it is generally desirable to have a technology allowing sample fractioning. In other words, it is generally desirable to have technology allowing samples eluting at different times to be collected separately from one another. These are aims of the present invention. More particularly, it is an aim of the present invention to provide a technology with a high recovery rate and less or almost no carry-over for fraction collection, especially for closely placed fractions/peaks and very small volume fraction collection.

At least some of these objects are met by the present invention.

In a first aspect, the present invention relates to a fluidic system, wherein the fluidic system comprises a switching valve comprising a plurality of ports, wherein the switching valve is configured for connecting the ports in different configurations, wherein the ports comprise a first port and a second port, an inlet line directly connected to the first port, a collection device directly connected to the second port, and wherein the fluidic system is configured to assume a collection configuration wherein the first port and the second port are connected. This configuration may represent a typical configuration of a fluidic system for fraction collection. Eluates from an analysis setup upstream of the inlet line may flow into the collection device and be collected into a collection reservoir subsequently. A delay volume between elution from the analytical detector and appearance of the fraction at the collection device may, for example, allow time for aligning the collection device over the collection reservoir that may be advantageous. Generally, in this specification, when a unit is said to be directly connected to a port of the switching valve (e.g., as is the inlet line to the first port), this denotes that there is a connection between the unit and the port, without there being another port of the switching valve being present in this connection.

The ports may comprise a third port and a fourth port, and the fluidic system may comprise a buffer section directly connected to the third port and the fourth port. The fluidic system with these components may be used to carry out collection of multiple fractions with a high recovery rate. In a typical fraction collection system, when switching from collection of one fraction to the next fraction, an intermediate step of letting fluid out into a waste may be employed to ensure that there is no mixing of fractions. However, as will be described below, a buffer section may help to collect different fractions, e.g., with lesser volume being discharged into the waste. In other words, the buffer section may prevent unwanted fractions/peaks from flowing into the collection device. Mixed fractions or peaks may exist only inside the buffer section. Different fractions/peaks, even closely placed fractions/peaks may be isolated, while reducing carry-over at the same time, using the buffer section.

The fluidic system may be configured to assume a buffer configuration, wherein the first port and the third port are connected and the fourth port and the second port are connected.

The ports may comprise a pump port directly connected to a pump and a waste port directly connected to waste. A pump, that may be a piston pump, connected with one port of the switching valve may be of advantage in cleaning up the buffer section between collection of different fractions. It may be filled up with the clean mobile phase (in case the fluidic system comprises an HPLC system) or with an additional cleaning/wash solvent first. Then it may be used to wash the buffer section fluidically connected to the switching valve. Cleaning up the buffer section may ensure that it is full of clean solvent or clean mobile phase.

The fluidic system described above may be configured to assume a buffer section wash configuration, wherein the pump port and the fourth port are connected and the third port and the waste port are connected. This may allow the buffer section to be flushed. As described above, mixed fractions/peaks may in some embodiments exist only inside the buffer section. After flushing is complete, the mixed fractions/peaks would be cleaned up and washed into the waste, for example, by actuating a piston of the pump. The buffer section may then be refilled with clean solvent or clean mobile phase already stored inside the cavity of the (piston) pump, for example.

The ports may comprise a discharge port directly connected to waste.

The fluidic system described above may be further configured to assume a discharge configuration, wherein the first port is connected to the discharge port.

The fluidic system as described above may be configured such that the buffer wash configuration and the discharge configuration are identical. Connecting the discharge port as well as the waste port directly to waste may be of advantage in allowing washing and/or refilling of the buffer section at the same time as the fluidic system is prepared for collection of a next fraction, when the buffer section is used in between collection of two fractions, for example. While the collection device is moved between collection reservoirs, for example, the flow through the inlet line may be directed into the waste via the discharge port. At the same time, the buffer section may also dispense its contents into the waste. This may help to improve the efficiency of the fraction collection process.

The fluidic system may further comprise a solvent reservoir configured to be connected to a port of the switching valve and to allow a solvent to be drawn out of it. The solvent may be the mobile phase used in an HPLC system flow in case the fluidic system is an HPLC system. The mobile phase may thus be additionally used as a flush solvent to flush out or dispense remaining liquid inside the collection device, that may comprise a collection tube and a collection needle, instead of an additional wash solvent provided separately for this purpose. This may help reduce complexity of the fluidic system, ease operations, and lead to less wastage.

The ports may comprise a solvent port directly connected to the solvent reservoir.

The fluidic system described above may be configured to assume a pump load configuration wherein the solvent port and the pump port are connected. This may allow the pump to easily draw up solvent from the solvent reservoir.

The pump load configuration may be identical to the collection configuration. As described above, in the buffer section wash configuration the buffer section may be washed and/or refilled with a solvent already stored inside the cavity of the (piston) pump. An advantage of the pump load configuration and the collection configuration may be that subsequent to refilling of the buffer section with clean solvent the pump may be refilled with clean solvent while at the same time collecting a fraction. This may help to improve the efficiency of the collection process.

The switching valve may comprise a first connecting element for connecting the ports. It may be advantageous for the connecting elements to have a dead volume significantly close to zero between the two ports they connect.

The first connecting element may connect the first port and the second port in the collection configuration, the first port and the discharge port in the discharge configuration, and the first port and the third port in the buffer configuration.

The switching valve may comprise a second connecting element for connecting the ports. The second connecting element may connect the solvent port and the pump port in the collection configuration, the fourth port and the pump port in the discharge configuration, and the second port and the fourth port in the buffer configuration.

The switching valve may comprise a third connecting element for connecting the ports. The third connecting element may connect the third port and the discharge port in the collection configuration, the third port and the waste port in the discharge configuration, and the waste port to a dead end in the buffer configuration.

The fluidic system may further comprise a wash section configured to receive the collection device. This may be helpful to clean the collection device between collection of different fractions leading to less carry-over.

The fluidic system may further comprise a first collection reservoir, wherein the fluidic system may be configured to position the collection device to expel a fluid into the first collection reservoir.

The fluidic system may comprise a second collection reservoir, wherein the fluidic system may be configured to position the collection device to expel a fluid into the second collection reservoir.

The collection device may comprise a collection needle. The collection needle may be chosen according to the samples are to be collected. A relevant consideration may be the viscosity or surface tension of the samples as a higher surface tension would imply a greater tendency to cling to the surface of the collection needle.

The collection device may comprise a collection tube.

The fluidic system may further comprise a flow sensor configured to measure a flow rate of fluid flowing through it.

The fluidic system as described above may be configured such that the flow sensor is configured to measure the flow rate of fluid being discharged into the waste. Measurement of the flow rate may be used to determine the time taken by eluates to flow from the analytical detector to the collection device. This flow time may be of relevance in determining the speed with which the collection needle may be positioned over a collection reservoir, or the speed at which the switching valve may be switched between different configurations as part of a fraction collection process.

The fluidic system may further comprise a control unit configured to switch between different configurations of the fluidic system.

The control unit may be configured to switch the configuration of the switching valve to switch the configuration of the fluidic system.

Switching the configuration of the switching valve may be based on a measurement of the flow rate of fluid being discharged into the waste. The control unit may be a microprocessor and may use measurements from the flow sensor, for example, to determine when to switch the configuration of the switching valve. For example, once a first fraction has been collected and a second fraction to be collected is detected upstream of the inlet line, the control unit may switch the switching valve from a collection configuration to a buffer section configuration, such that flow of the fluid is routed through the buffer section. This would allow the first fraction to fill up in the buffer section with clean solvent and may lead to less loss of sample.

The control unit may be further configured to position the collection device to expel fluid into a collection reservoir. For example, once a first fraction has been collected and a second fraction is to be further collected, the control unit may cause the collection device to move to the correct position above the collection reservoir for the second fraction. It may be particularly advantageous to use a control unit for this process, in order to ensure that the timing is accurately controlled and reproducible between different collections of fractions.

The pump as described above may be a metering device. It may comprise a piston and a housing. Or, it may be a flush pump. It may further comprise a container containing a pressurized gas.

The fluidic system may further comprise an analytical detector upstream of the first port. The analytical detector may serve to indicate the arrival of different fractions to the control unit, for example, so that the switching valve and the collection device may be brought into an appropriate configuration for collection of the fractions in their corresponding collection reservoirs.

The fluidic system described above may be a liquid chromatography system, preferably a high performance liquid chromatography system.

The solvent as described above may be identical to a mobile phase used in the liquid chromatography system. This may be different from a typical fraction collection process where a special solvent may need to be provided to wash the collection tube and collection device so that more operations and/or specific solvents may be needed. Alternatively, no washing solvent may be used for washing the collection device which may lead to higher carry-over.

The solvent as described above may be different from the mobile phase used in the liquid chromatography system. This may, however, not be a preferred embodiment owing to additional complexity of operations and system involved in using an additional solvent.

The solvent as described above may be any of an organic solvent, an inorganic solvent, a polar solvent, or a non-polar solvent.

Switching the switching valve as described above from the discharge configuration to the collection configuration may comprise rotating the switching valve by an angle between 10° and 80°, preferably between 20° and 70°, and further preferably between 30° and 60°. Smaller angles may help to switch the switching valve quickly. However, they may also make placement of ports on the switching valve more complex.

Switching the switching valve as described above from the collection configuration to the buffer configuration may comprise rotating the switching valve by an angle between 10° and 80°, preferably between 20° and 70°, and further preferably between 30° and 60°.

The switching valve as described above may comprise ports such that the second port is between the fourth port and the discharge port, the third port is between the discharge port and the waste port, and the solvent port is between the waste port and the pump port.

The switching valve as described above may comprise ports such that the fourth port is between the second port and the pump port, the discharge port is between the second port and the third port, the waste port is between the third port and the solvent port, and the pump port is between the solvent port and the fourth port.

The switching valve as described above may comprise ports such that the first port is at substantially the same distance from the other ports.

The wash section described above may be further configured to draw the solvent from the solvent reservoir for washing the outer surface of the collection needle. This may help to simplify the system as the same solvent may be used to wash the outer surface of the collection needle as that used for cleaning the buffer section.

The collection device described above may be configured for one-dimensional positioning. For example, this may be the case when a plurality of collection reservoirs are placed next to each other in a one-dimensional array. This may allow for a simpler controlling procedure for moving the collection device over the collection reservoirs. However, it may also limit the number of collection reservoirs that may be filled with fractions.

Alternatively, the collection device may be configured for two-dimensional positioning. This may allow for a larger number of collection reservoirs to be filled with fractions with only a small movement of the collection device. However, as will be appreciated, this may involve a more complex alignment procedure of the collection device over the collection reservoir.

According to a second aspect, the present invention also relates to a switching valve. The switching valve comprises a plurality of ports, and the switching valve is configured for connecting the ports in different configurations. The ports comprise a first port, a second port, and a discharge port, the switching valve comprises a stator, the stator comprises the plurality of ports, and the switching valve comprises a rotor, wherein the rotor comprises at least one connecting element for connecting the ports in the different configurations. When the term discharge port is used in conjunction with the switching valve, it should be understood that this is for conformity with the terminology used when describing the system only. That is, the term discharge port only stipulates that the respective port can in principle also be used as a discharge port, without this necessitating that the port is actually used as such a discharge port. Corresponding considerations also apply to the terms collection configuration, discharge configuration, and buffer configuration when used to describe the valve. Again, these terms are mainly used to disambiguate the different configurations, without there being the necessity that the respective configurations are actually used for collection, discharge, and buffer functionalities.

The at least one connecting element may be at least one groove.

One of the at least one element may comprise an L-shaped groove comprising a radial section and a circumferential section.

The at least one element comprise 3 connecting elements and each of the 2 other connecting elements may lie on opposite sides of the L-shaped groove.

The rotor may comprise a groove connected to the second port and extending between the second port and the discharge port.

The rotor may comprise a third port.

The rotor may comprise a groove connected to the discharge port and extending between the discharge port and the third port.

A sub set of the plurality of ports may lie on a circle around the first port.

The switching valve may be configured to assume a collection configuration fluidly connecting the first port and the second port.

The switching valve may be configured to assume a discharge configuration fluidly connecting the first port and the discharge port.

The switching valve may be configured to transition from the collection configuration to the discharge configuration such that the first port is always connected to the second port or the discharge port during the transition.

The switching valve may be configured to assume a buffer configuration, wherein the first port and the third port are connected.

The switching valve may be configured to transition from the discharge configuration to the buffer configuration such that the first port is always connected to the discharge port or to the third port during the transition.

The fluid connection between the first port and the second port in the collection configuration may be dead volume free.

The fluid connection between the first port and the discharge port in the discharge configuration may be free of dead volumes.

The fluid connection between the first port and the third port in the buffer configuration may comprise free of dead volumes.

In the described system, the switching valve may be realized according to the switching valve of the second aspect.

According to a third aspect, the present invention relates to a method of operating the fluidic system as described above wherein the method comprises the fluidic system assuming the collection configuration and causing a fluid flow through the inlet line, the first port, the second port, and the collection device into the first collection reservoir in the collection configuration.

The method may comprise the fluidic system assuming the buffer configuration and causing a second fluid flow flowing through the inlet line, the first port, the third port, the buffer section, the fourth port, the second port, and the collection device in the buffer configuration.

The second fluid flow as described above may cause fluid to flow into the first collection reservoir. Thus, the buffer section may be used to direct fluid flow close to the end of collection of one fraction and before starting collection of the next fraction. This may help to collect the two fractions, even if they are closely placed, without contaminating one with the other. The contaminated fractions exist only inside the buffer section and may be washed in a subsequent buffer section wash configuration.

The method may further comprise the fluidic system assuming the buffer section wash configuration after the fluidic system assumes the buffer configuration, and the fluidic system causing a washing flow through the pump port, the fourth port, the buffer section, the third port, the waste port and towards the waste in the buffer section wash configuration.

The method may further comprise the fluidic system again assuming the collection configuration after the fluidic system assumes the buffer section wash configuration, and the fluidic system causing a fluid flow through the inlet line, the first port, the second port, and the collection device into the second collection reservoir in the collection configuration.

The method may further comprise measuring a dead volume of the flow path of the fluid in any configuration of the fluidic system.

The method may further comprise using the dead volume measured in a configuration and the flow rate of fluid measured by the flow sensor to determine the time to switch the configuration of the fluidic system.

The method may further comprise using the control unit to switch the configuration of the fluidic system.

The method may further comprise switching the position of the collection device to switch the configuration of the fluidic system.

The method may further comprise switching the configuration of the switching valve to switch the configuration of the fluidic system. For example, the switching valve may be switched between the collection configuration, the buffer section configuration, and the buffer section wash configuration, where in each of these configurations the plurality of connecting elements connect different pairs of ports.

The method may further comprise the fluidic system assuming the discharge configuration after the fluidic system assumes the collection configuration, and the fluidic system causing a washing flow through the inlet line, the first port, and towards the waste in the discharge configuration. This may be a configuration where the fluidic system is used to collect fractions without an intermediate buffer section wash configuration. Omitting the buffer section wash configuration may help to further improve efficiency of the collection process.

The method may further comprise the fluidic system again assuming the collection configuration after the fluidic system assumes the discharge configuration, and the fluidic system causing a fluid flow through the inlet line, the first port, the second port, and the collection device into the second collection reservoir in the collection configuration.

When the fluid flows into the first collection reservoir, a first sample constituent may be collected in the first collection reservoir, and when the fluid flows into the second collection reservoir, a second sample constituent may be collected in the second sample reservoir.

According to a third aspect, the present invention relates to a computer program product comprising instructions configured to, when run on a control unit of the fluidic system, cause the fluidic system to perform the method according to any of the preceding method embodiments. For example, such a product may comprise instructions to switch the switching valve to, for example, a collection configuration once a fraction appears at the analytical detector. Or, if a first fraction was being collected and a second fraction appears at the analytical detector, the control unit may be programmed to switch the switching valve to a buffer section configuration. Similarly, towards the end of collection of a first fraction, the control unit may be programmed to position the collection device over a second collection reservoir.

Overall, embodiments of the present technology may thus relate to a fluidics design, which makes it possible to collect closely placed fractions/peaks with flush function (flush out or dispense remaining liquid inside collection tube and needle to improve recovery rate and reduce carry over). In embodiments, a valve, which may be referred to as a fraction valve (realized as a multi-port rotary valve) may be used for the fraction collector, embedded inside the product to divert HPLC system flow into waste, collection vessels or flush position (still connecting to collection vessels) by switching at a very high speed over at least three positions: waste position, collection position, and flush position.

Below, system embodiments will be discussed. These embodiments are abbreviated by the letter "S" followed by a number. Whenever reference is herein made to system embodiments, these embodiments are meant.

S1. A fluidic system, wherein the fluidic system comprises
- a switching valve comprising a plurality of ports, wherein the switching valve is configured for connecting the ports in different configurations, wherein the ports comprise a first port and a second port,
- an inlet line directly connected to the first port,
- a collection device directly connected to the second port, and
- wherein the fluidic system is configured to assume a collection configuration, wherein the first port and the second port are connected.

S2. The fluidic system according to the preceding embodiment,
- where the ports comprise a third port and a fourth port,
- wherein the fluidic system comprises a buffer section directly connected to the third port and the fourth port.

S3. The fluidic system according to the preceding embodiment,
- wherein the fluidic system is configured to assume a buffer configuration, wherein the first port and the third port are connected and the fourth port and the second port are connected.

S4. The fluidic system according to any of the preceding embodiments,
- wherein the ports comprise a pump port directly connected to a pump and a waste port directly connected to waste.

S5. The fluidic system according to the preceding embodiment and with the features of embodiment S2,
- wherein the fluidic system is configured to assume a buffer section wash configuration, wherein the pump port and the fourth port are connected and the third port and the waste port are connected.

S6. The fluidic system according to any of the preceding embodiments,
- wherein the ports comprise a discharge port directly connected to waste.

S7. The fluidic system according to the preceding embodiment,
- wherein the fluidic system is configured to assume a discharge configuration, wherein the first port is connected to the discharge port.

S8. The fluidic system according to the preceding embodiment and with the features of embodiment S5, wherein the buffer wash configuration and the discharge configuration are identical.

S9. The fluidic system according to any of the preceding embodiments, wherein the fluidic system further comprises a solvent reservoir configured to be connected to a port of the switching valve and to allow a solvent to be drawn out of it.

S10. The fluidic system according to the preceding embodiment,
- wherein the ports comprise a solvent port directly connected to the solvent reservoir.

S11. The fluidic system according to the preceding embodiment and with the features of embodiment S4,
- wherein the fluidic system is configured to assume a pump load configuration wherein the solvent port and the pump port are connected.

S12. The fluidic system according to the preceding embodiment, wherein the pump load configuration is identical to the collection configuration.

S13. The fluidic system according to any of the preceding embodiments, wherein the switching valve comprises a first connecting element for connecting the ports.

S14. The fluidic system according to the preceding embodiment, wherein the first connecting element connects the first port and the second port in the collection configuration.

S15. The fluidic system according to any of the 2 preceding embodiments, wherein the first connecting element connects the first port and the discharge port in the discharge configuration.

S16. The fluidic system according to any of the preceding embodiments with the features of embodiments S3 and S13, wherein the first connecting element connects the first port and the third port in the buffer configuration.

S17. The fluidic system according to any of the preceding embodiments, wherein the switching valve comprises a second connecting element for connecting the ports.

S18. The fluidic system according to the preceding embodiment and with the features of embodiments S4 and S10, wherein the second connecting element connects the solvent port and the pump port in the collection configuration.

S19. The fluidic system according to any of the 2 preceding embodiments and with the features of embodiments S2 and S4, wherein the second connecting element connects the fourth port and the pump port in the discharge configuration.

S20. The fluidic system according to any of the preceding embodiments with the features of embodiments S2 and S17, wherein the second connecting element connects the second port and the fourth port in the buffer configuration.

S21. The fluidic system according to any of the preceding embodiments, wherein the switching valve comprises a third connecting element for connecting the ports.

S22. The fluidic system according to the preceding embodiment, wherein the third connecting element connects the third port and the discharge port in the collection configuration.

S23. The fluidic system according to the penultimate embodiment and with the features of embodiments S3 and S7, wherein the third connecting element connects the third port and the waste port in the discharge configuration.

S24. The fluidic system according to any of the preceding embodiments with the features of embodiment S3, S4, and S21, wherein the third connecting element connects the waste port to a dead end in the buffer configuration.

S25. The fluidic system according to any of the preceding embodiments, wherein the fluidic system comprises a wash section configured to receive the collection device.

S26. The fluidic system according to any of the preceding embodiments, wherein the fluidic system comprises a first collection reservoir, and wherein the fluidic system is configured to position the collection device to expel a fluid into the first collection reservoir.

S27. The fluidic system according to any of the preceding embodiments, wherein the fluidic system comprises a second collection reservoir, and wherein the fluidic system is configured to position the collection device to expel a fluid into the second collection reservoir.

S28. The fluidic system according to any of the preceding embodiments, wherein the collection device comprises a collection needle.

S29. The fluidic system according to any of the preceding embodiments, wherein the collection device comprises a collection tube.

S30. The fluidic system according to any of the preceding embodiments, wherein the fluidic system further comprises a flow sensor configured to measure a flow rate of fluid flowing through it.

S31. The fluidic system according to the preceding embodiment and with the features of embodiment S4, wherein the flow sensor is configured to measure the flow rate of fluid being discharged into the waste.

S32. The fluidic system according to any of the preceding embodiments, wherein the fluidic system further comprises a control unit configured to switch between different configurations of the fluidic system.

S33. The fluidic system according to the preceding embodiment, wherein the control unit is configured to switch the configuration of the switching valve to switch the configuration of the fluidic system.

S34. The fluidic system according to any of the preceding embodiments with the features of embodiments S31 and S32, wherein switching the configuration of the switching valve is based on a measurement of the flow rate of fluid being discharged into the waste.

S35. The fluidic system according to any of the preceding embodiments and with the features of embodiment S32 and any of embodiments S26, and S27, wherein the control unit is further configured to position the collection device to expel fluid into a collection reservoir.

S36. The fluidic system according to any of the preceding embodiments and with the features of embodiment S4, wherein the pump is a metering device.

S37. The fluidic system according to any of the preceding embodiments and with the features of embodiment S4, wherein the pump comprises a piston and a housing.

S38. The fluidic system according to any of the preceding embodiments and with the features of embodiment S4, wherein the pump is a flush pump.

S39. The fluidic system according to any of the preceding embodiments and with the features of embodiment S4, wherein the pump comprises a container containing a pressurized gas.

S40. The fluidic system according to any of the preceding embodiments, wherein the fluidic system further comprises an analytical detector upstream of the first port.

S41. The fluidic system according to any of the preceding embodiments, wherein the fluidic system is a liquid chromatography system, preferably a high performance liquid chromatography system.

S42. The fluidic system according to the preceding embodiment and with the features of embodiment S9, wherein the solvent is identical to a mobile phase used in the liquid chromatography system.

S43. The fluidic system according to the penultimate embodiment and with the features of embodiment S9, wherein the solvent is different from the mobile phase used in the liquid chromatography system.

S44. The fluidic system according to any of the preceding embodiments and with the features of embodiment S9, wherein the solvent is an organic solvent.

S45. The fluidic system according to any of the preceding embodiments and with the features of embodiment S9, wherein the solvent is an inorganic solvent.

S46. The fluidic system according to any of the preceding embodiments and with the features of embodiment S9, wherein the solvent is a polar solvent.

S47. The fluidic system according to any of the preceding embodiments and with the features of embodiment S9, wherein the solvent is a non-polar solvent.

S48. The fluidic system according to any of the preceding embodiments with the features of embodiment S7, wherein switching the switching valve from the discharge configuration to the collection configuration comprises rotating the switching valve by an angle between 10° and 80°, preferably between 20° and 70°, and further preferably between 30° and 60°.

S49. The fluidic system according to any of the preceding embodiments with the features of embodiment S3, wherein switching the switching valve from the collection configuration to the buffer configuration comprises rotating the switching valve by an angle between 10° and 80°, preferably between 20° and 70°, and further preferably between 30° and 60°.

S50. The fluidic system according to any of the preceding embodiments with the features of embodiments S2, S4, S6, and S10, wherein the second port is between the fourth port and the discharge port, the third port is between the discharge port and the waste port, and the solvent port is between the waste port and the pump port.

S51. The fluidic system according to any of the preceding embodiments with the features of embodiments S2, S4, S6, and S10, wherein the fourth port is between the second port and the pump port, the discharge port is between the second port and the third port, the waste port is between the third port and the solvent port, and the pump port is between the solvent port and the fourth port.

S52. The fluidic system according to any of the 2 preceding embodiments, wherein the first port is at substantially the same distance from the other ports.

S53. The fluidic system according to any of the preceding embodiments and with the features of embodiments S9, S25, and S28, wherein the wash section is further configured to draw the solvent from the solvent reservoir for washing the outer surface of the collection needle.

S54. The fluidic system according to any of the preceding embodiments, wherein the collection device is configured for one-dimensional positioning.

S55. The fluidic system according to any of the preceding embodiments but without the features of the preceding embodiment, wherein the collection device is configured for two-dimensional positioning.

Below, valve embodiments will be discussed. These embodiments are abbreviated with the letter V followed by a number. Whenever reference is herein made to valve embodiments, these embodiments are meant.

V1. A switching valve, wherein the switching valve comprises a plurality of ports, wherein the switching valve is configured for connecting the ports in different configurations, wherein the ports comprise a first port (0), a second port (2), and a discharge port (3), wherein the switching valve comprises a stator, wherein the stator comprises the plurality of ports, wherein the switching valve comprises a rotor, wherein the rotor comprises at least one connecting element for connecting the ports in the different configurations.

V2. The switching valve according to the preceding embodiment, wherein the at least one connecting element is at least one groove.

V3. The switching valve according to any of the preceding valve embodiments, wherein one of the at least one element comprises an L-shaped groove comprising a radial section and a circumferential section.

V4. The switching valve according to the preceding embodiment, wherein the at least one element comprise 3 connecting elements and each of the 2 other connecting elements lie on opposite sides of the L-shaped groove.

V5. The switching valve according to any of the preceding valve embodiments, wherein the rotor comprises a groove connected to the second port and extending between the second port and the discharge port.

V6. The switching valve according to any of the preceding valve embodiments, wherein the rotor comprises a third port.

V7. The switching valve according to the preceding embodiment and with the features of embodiment V5, wherein the rotor comprises a groove connected to the discharge port and extending between the discharge port and the third port.

V8. The switching valve according to any of the preceding valve embodiments, wherein a sub set of the plurality of ports lie on a circle around the first port.

V9. The switching valve according to any of the preceding valve embodiments, wherein the switching valve is configured to assume a collection configuration fluidly connecting the first port and the second port.

V10. The switching valve according to any of the preceding valve embodiments, wherein the switching valve is configured to assume a discharge configuration fluidly connecting the first port and the discharge port.

V11. The switching valve according to the preceding embodiment and with the features of the penultimate embodiment, wherein the switching valve is configured to transition from the collection configuration to the discharge configuration such that the first port is always connected to the second port or the discharge port during the transition.

V12. The switching valve according to any of the preceding embodiments and with the features of embodiment V6, wherein the switching valve is configured to assume a buffer configuration, wherein the first port and the third port are connected.

V13. The switching valve according to the preceding embodiment and with the features of embodiment V10, wherein the switching valve is configured to transition from the discharge configuration to the buffer configuration such that the first port is always connected to the discharge port or to the third port during the transition.

V14. The switching valve according to any of the preceding embodiments with the features of embodiment V9, wherein the fluid connection between the first port and the second port in the collection configuration is dead volume free.

V15. The switching valve according to any of the preceding embodiments with the features of embodiment V10, wherein the fluid connection between the first port and the discharge port in the discharge configuration is dead volume free.

V16. The switching valve according to any of the preceding embodiments with the features of embodiment V12, wherein the fluid connection between the first port and the third port in the buffer configuration is dead volumes free.

S56. The system according to any of the preceding system embodiments, wherein the switching valve is realized according to any of the preceding valve embodiments.

Below, method embodiments will be discussed. These embodiments are abbreviated by the letter "M" followed by a number. Whenever reference is herein made to method embodiments, these embodiments are meant.

M1. A method of operating the fluidic system according to any of the preceding embodiments with the features of embodiment S26, wherein the method comprises the fluidic system assuming the collection configuration and causing a fluid flow through the inlet line, the first port, the second port, and the collection device into the first collection reservoir in the collection configuration.

M2. The method according to the preceding embodiment, wherein the fluidic system comprises the features of embodiment S3, wherein the method comprises the fluidic system assuming the buffer configuration and causing a second fluid flow flowing through the inlet line, the first port, the third port, the buffer section, the fourth port, the second port, and the collection device in the buffer configuration.

M3. The method according to the preceding embodiment, wherein the second fluid flow causes fluid to flow into the first collection reservoir.

M4. The method according to any of the 2 preceding embodiments, wherein the fluidic system comprises the features of embodiment S5, wherein the method further comprises the fluidic system assuming the buffer section wash configuration after the fluidic system assumes the buffer configuration, and the fluidic system causing a washing flow through the pump port, the fourth port, the buffer section, the third port, the waste port and towards the waste in the buffer section wash configuration.

M5. The method according to the preceding embodiment, wherein the fluidic system comprises the features of embodiment S27, wherein the method further comprises the fluidic system again assuming the collection configuration after the fluidic system assumes the buffer section wash configuration, and the fluidic system causing a fluid flow through the inlet line, the first port, the second port, and the collection device into the second collection reservoir in the collection configuration.

M6. The method according to any of the preceding method embodiments, wherein the method further comprises measuring a dead volume of the flow path of the fluid in any configuration of the fluidic system.

M7. The method according to the preceding embodiment, wherein the fluidic system comprises the features of embodiment S30, wherein the method further comprises using the dead volume measured in a configuration and the flow rate of fluid measured by the flow sensor to determine the time to switch the configuration of the fluidic system.

M8. The method according to any of the preceding method embodiments, wherein the fluidic system comprises the features of embodiment S32, wherein the method further comprises using the control unit to switch the configuration of the fluidic system.

M9. The method according to any of the preceding method embodiments, wherein the fluidic system comprises the features of embodiment S35, wherein the method further comprises switching the position of the collection device to switch the configuration of the fluidic system.

M10. The method according to any of the preceding method embodiments, wherein the fluidic system comprises the features of embodiment S33, wherein the method further comprises switching the configuration of the switching valve to switch the configuration of the fluidic system.

M11. The method according to any of the preceding method embodiments, wherein the fluidic system comprises the features of embodiment S7, wherein the method further comprises the fluidic system assuming the discharge configuration [FIG. 9] after the fluidic system assumes the collection configuration, and the fluidic system causing a washing flow through the inlet line, the first port, and towards the waste in the discharge configuration.

M12. The method according to the preceding embodiment, wherein the fluidic system comprises the features of embodiment S27, wherein the method further comprises the fluidic system again assuming the collection configuration after the fluidic system assumes the discharge configuration, and the fluidic system causing a fluid flow through the inlet line, the first port, the second port, and the collection device into the second collection reservoir in the collection configuration.

M13. The method according to any of the preceding method embodiments with the features of embodiment M5 and/or M12, wherein when the fluid flows into the first collection reservoir, a first sample constituent is collected in the first collection reservoir, and when the fluid flows into the second collection reservoir, a second sample constituent is collected in the second sample reservoir.

P1. A computer program product comprising instructions configured to, when run on a control unit of the fluidic system, cause the fluidic system to perform the method according to any of the preceding method embodiments.

DETAILED DESCRIPTION

Figure 1:
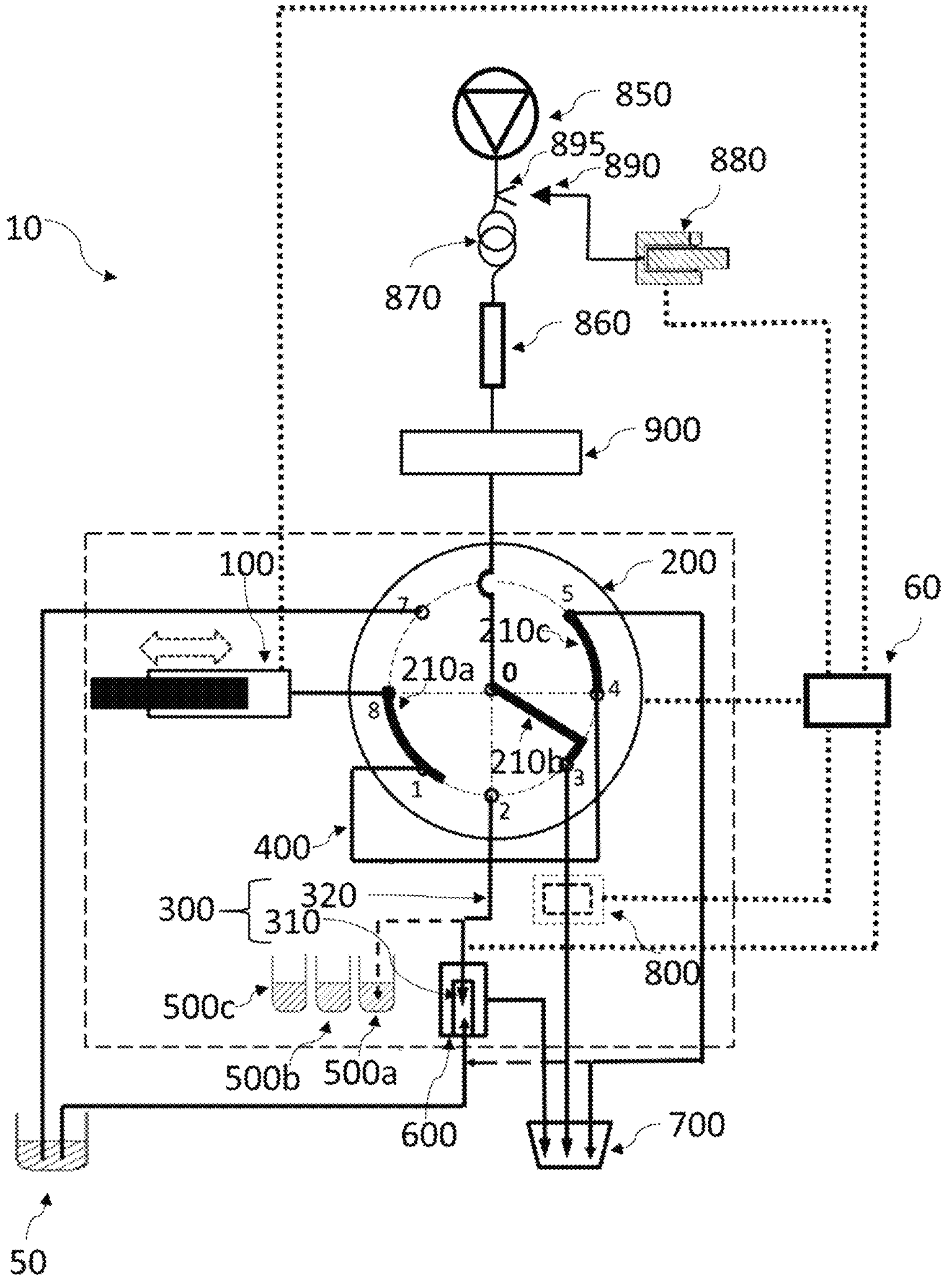
FIG. 1 depicts a fluidic system in an idle state.

FIG. 1 depicts one embodiment of a fluidic system 10, that may be a liquid chromatography system, preferably an HPLC system, that may be used to collect fractions eluted downstream of a detector 900. The detector 900 may be a UV detector, that may detect presence of components in the fluid flowing through it based on an absorption of light by the components in the fluid, or it may be another non-destructive detector, e.g., another optical detector. It will be understood that the fluidic system 10 may be configured to be used together with other components of the HPLC system, that may comprise at least a separation column 860 upstream of the detector 900, a sample storage section, e.g., a sample loop 870 upstream of the separation column 860 and an analytical pump 850 driving the mixture of a solvent and sample from the storage section 870 through the separation column 860. Furthermore, the system may also comprise a unit 880 for introducing a sample into a system, e.g., a metering device 880 connected to a needle 890, which may be connected to a needle seat 895. While these components are only depicted in FIG. 1 for sake of simplicity of the illustrations, those skilled in the art will understand that such components may also be present in the configurations depicted in the other Figures.

The fluidic system 10, that may also be referred to as a fraction collector, may further comprise a rotary valve 200 (that may be called a fraction or switching valve) that comprises a plurality of ports (0 to 8, where the first port 0 is directly connected to the detector 900 via an inlet line and carries the mixture eluted from the separation column) and a plurality of connecting elements 210, that may be called the first connecting element 210*b*, the second connecting element 210*a*, and the third connecting element 210*c*. Each of the connecting elements 210 is configured to changeably connect the plurality of ports of the valve 200. The system 10 further comprises a waste reservoir 700 directly connected to a discharge port 3 and a waste port 5 of the valve. The system 10 may also comprise a pump 100 (that may be a flush pump, or a container with pressurized gas, or a metering device) directly connected to a pump port 8, and a collection device 300, that may comprise a collection tube 320 and a collection needle 310. The collection device 300 may be directly connected to the second port 2. The pump 100 may be configured to provide an operating pressure of 8 bar, for example. It may further comprise an internal cavity that may store the cleaning/wash solvent. The volume of the internal cavity may, for example, be 1 ml. The depicted system 10 further comprises a wash section 600 that may be used to wash the collection needle 310, and a buffer section 400, that may be a buffer ring, directly connected to the third port 4 and to the fourth port 1 of the switching valve 200.

When a component is said to be directly connected to a port of the switching valve 200, this should denote a fluid connection between the component and the respective port of the switching valve 200, without there being another port present in the connection between the component and the respective port. For example, in the configuration depicted in FIG. 1, the detector 900 is directly connected to the first port 0. These two elements are connected to one another and there is no other port present in this connection. Further, in FIG. 1, the detector 900 is also connected to the port 3, which may be referred to as discharge port 3. However, the connection between the detector 900 and the discharge port 3 is via the first port 0. That is, there is another port of the valve 200 present in this connection, such that this connection is not a direct connection as used in the present specification.

With further regard to the Figures, it is noted that in the depicted Figures, no port 6 is depicted. Thus, whenever mention is made of ports 0 to 8, it may be understood that the port 6 is absent from the switching valve. Alternatively, it may be present on the switching valve but may not be involved in carrying out the method described below.

The fluidic system 10 further comprises a plurality of collection reservoirs 500 (500*a*, 500*b*, 500*c*), which may also be referred to as vials, that may be used to collect a plurality of fractions eluted from a separation column upstream of the detector 900, and a solvent reservoir 50 that may comprise a solvent that may be used for washing the fluidics in the fluidic system 10, such as the buffer section 400 or the collection device 300. The collection needle 310 may be configured to be moved into one of the plurality of collection reservoirs 500 when needed. In embodiments, the collection reservoirs 500 may be arranged in a 1-dimensional or 2-dimensional array and the motion of the collection needle 310 may be appropriately configured. The solvent reservoir 50 may be further connected directly to the wash section 600 to provide a wash solvent for washing the outer surface of the connection needle 310. That is, in the example depicted in FIG. 1, the same solvent is used to wash both the buffer section 400 and the outer surface of the connection needle 310. However, this is merely exemplary and different solvents may be provided in different solvent reservoirs 50 to wash the buffer section 400 and the outer surface of the connection needle 310. In this case, there may be different solvent reservoirs, one connected to the port 7 and another one being connected to wash section 600.

The fluidic system 10 may further comprise at least one flow sensor 800 (or a plurality of flow sensors). At least one of these flow sensors 800 may be installed on the waste line, i.e., upstream of the waste reservoir 700 and configured to measure a flow rate of fluid that flows into the waste reservoir 700. This may help to determine the time at which a fraction to be collected arrives into the collection needle 310 as follows: a delay volume of the fluidics connecting the outlet of the detector 900 to the collection needle 310 may be determined, e.g., at the start of the separation process. Then, based on the flow rate of fluid being discharged into the waste reservoir 700, the time needed for a peak to travel to the collection needle 310 after being eluted from the detector 900 may be determined, for example. This would then represent an upper limit for the time needed for accurately switching the switching valve 200 and bringing the collection needle 310 to an empty collection reservoir 500, for example, after detecting the peak in the detector 900.

The fluidic system 10 may further comprise a control unit 60, configured to control the rotation of the rotor based on feedback from the flow sensor 800, where the data connection is depicted as dotted lines. This may allow switching the operating modes of the fluidic system 10 to a suitable mode as described further below.

The control unit 60, which may also be referred to as controller 60, can be operatively connected to other components, as depicted by dotted lines in FIG. 1. More particularly, the controller 60 may be operatively connected to the valve 200 (and more particularly to rotatable drives thereof), to the sensor 800, to the pump 100, to the metering device 880 (and more particularly to a stepper motor of the metering device 880), and to the collection device 300.

The controller 60 can include a data processing unit and may be configured to control the system and carry out particular method steps. The controller can send or receive electronic signals for instructions. The controller can also be referred to as a microprocessor. The controller can be contained on an integrated-circuit chip. The controller can include a processor with memory and associated circuits. A microprocessor is a computer processor that incorporates the functions of a central processing unit on a single integrated circuit (IC), or sometimes up to a plurality of integrated circuits, such as 8 integrated circuits. The microprocessor may be a multipurpose, clock driven, register based, digital integrated circuit that accepts binary data as input, processes it according to instructions stored in its memory and provides results (also in binary form) as output. Microprocessors may contain both combinational logic and sequential digital logic. Microprocessors operate on numbers and symbols represented in the binary number system.

While the controller 60 is only depicted in FIG. 1 (for sake of simplicity), it should be understood that the controller is typically also present when the system assumes the other configurations depicted in the other Figures.

Additionally, the fluidic system 10 may be further configured to be used together with a computer program product that may comprise instructions for causing the control unit to switch the switching valve 200 and/or to move the collection needle 310 over a designated collection reservoir 500.

FIG. 1 further depicts a configuration of the fluidic system 10 where the second connecting element 210*a* connects ports 1 and 8, the first connecting element 210*b* connects ports 0 and 3, and the third connecting element 210*c* connects ports 4 and 5. The configuration depicted in FIG. 1 may represent a typical setup in a chromatographic separation process without a fraction collector, wherein fluid is passed into the waste reservoir 700 after being analyzed in the detector 900. In this configuration, no eluates are collected in the collection reservoirs 500. Because the waste reservoir 700 may have been used to collect liquid from prior steps in the separation process, including, for e.g., a step of washing and equilibrating the separation column, the mixture collected in the waste reservoir 700 may not be suitable for a further analysis. Thus, it may be advantageous to provide a separate fraction collection procedure (i.e., a procedure to collect defined fractions of the sample to different reservoirs) if further analysis of the eluted fractions is to be carried out.

It may also be noted that the flush solvent used to dispense remaining liquid inside the collection device 300 and collection needle 310 depicted in FIG. 1 may be either the mobile phase used in the fluidic system (that may be an HPLC system) flow or it may be an additional wash solvent prepared by a user. The additional cleaning/wash solvent may also be used to fill up the pump 100 before each sample injection.

Thus, in other words, the fluidic system 10 as depicted in FIG. 1 may comprise a fraction collection system, that may be called a fraction collector. The fluidic system 10 may comprise a multi-port rotary valve, or switching valve 200, that may also be referred to as a fraction valve, a flow sensor 800 (or a plurality of flow sensors) installed on a waste line to the waste reservoir 700, a pump 100, a collection device 300 comprising a collection needle 310 and a collection tube 320 and its wash section 600, and a buffer section 400.

It is an aim of the present invention to use the additional components as depicted in FIG. 1, namely, the switching valve 200, the buffer section 400, and the collection reservoirs 500, to provide a robust method to collect fractions downstream of the detector 900. Embodiments of the method and how the depicted configuration may be used to collect a plurality of fractions will now be described.

Figure 2A:
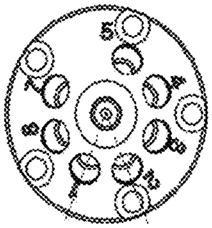
FIGS. 2A-2D depict a switching valve configured to be used in the fluidic system.

FIG. 2A depicts an exemplary design of the switching valve 200. It may comprise a static part, that may be called a stator, comprising the plurality of ports 0 to 8 with direct connections to other components of the fluidic system 10 as described above. The plurality of ports 0 to 8 may be positioned on the stator in a circular arrangement as shown in FIG. 2A.

Figure 2B:
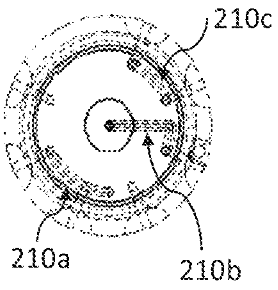
Figure 2C:
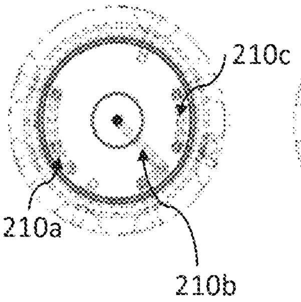
Figure 2D:
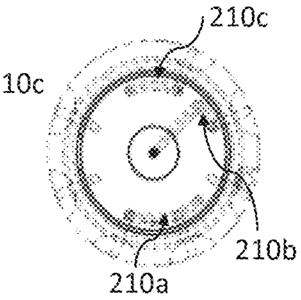

The switching valve 200 may further comprise a rotating section, that may be called a rotor, that may comprise a plurality of connecting elements 210, for e.g., 3 connecting elements, 210*a*, 210*b*, 210*c*, configured to provide a fluidic connection between ports of the stator that each of them connects. The connecting elements may be positioned on the rotor as shown in FIGS. 2B-2D, for example. The dashed lines in FIGS. 2B-2D indicate parts of the switching valve 200 hidden from the view depicted in FIG. 2A, where the rotor is attached underneath the stator.

The rotor may be configured to be rotated about an axis perpendicular to the plane of the rotor and passing through its center. The angle by which the rotor may be allowed to rotate may be determined by the relative position of the connecting elements 210 and the ports 0 to 8. For example, in the configuration depicted in FIGS. 2A-2D, the rotor may be configured to rotate by +45° with respect to a discharge configuration depicted in FIG. 2B, where the second connecting element 210*a* is shown to connect ports 1 and 8, the first connecting element 210*b* is shown to connect ports 0 and 3, and the third connecting element 210*c* is shown to connect ports 4 and 5. Note that this is also the configuration depicted in FIG. 1. The rotation angle may be chosen to be between 10° and 80°, preferably between 20° and 70°, and further preferably between 30° and 60°. A smaller angle of rotation may allow the rotor to be rotated quickly, improving the efficiency of the fractionation process.

FIGS. 2A-2D further depict two additional configurations of the rotor. FIG. 2A depicts a collection configuration of the rotor, wherein the second connecting element 210*a* connects ports 7 and 8, the first connecting element 210*b* connects ports 0 and 2, and the third connecting element 210*c* connects ports 3 and 4. This configuration may be obtained, for e.g., by rotating the rotor by −45° from the discharge configuration depicted in FIG. 2B.

A further configuration is depicted in FIG. 2D that may be called a buffer configuration, obtained by rotating the rotor by +45° from the discharge configuration (see FIG. 2B). In this configuration the second connecting element 210*a* connects ports 1 and 2, the first connecting element 210*b* connects ports 0 and 4, and the third connecting element 210*c* connects port 5 to a dead port, i.e., flow into port 5 is stopped.

In the depicted embodiments, the connecting elements 210*a*, 210*b*, and 210*c* are depicted with particular shapes. With regard to FIG. 1 and FIGS. 2A-2D, it will be understood that the first port 0 may be in the center of the valve 200 and that the other ports 1 to 8 may be arranged on a ring or circle with an identical distance to the central port 0. The first connecting element 210*b* may be generally configured to connect the central port 0 with one of the circumferential ports 1 to 3, and the second and third connecting elements 210*a*, 210*c* are configured to connect two of the circumferential ports 1 to 8.

In the depicted embodiment, the first connecting element 210*b* is depicted to be hook shaped. That is, it comprises a straight section and an arcuate section. However, it will be understood that this is only one example and that the first connecting element may also be realized in other manners, e.g., it may only comprise a straight section.

Furthermore, the second and third connecting elements 210*a*, 210*c*, are depicted to be arcuate. Again, it should be understood that this is merely exemplary and that they may also be shaped differently (e.g., they may be straight).

Furthermore, as depicted in the Figures, the circumferential ports 1 to 7 may preferably be located at equal distances to one another (with the exception of ports 5 and 7). Further still, as depicted, e.g., in FIG. 1, the connecting elements 210 may establish the connections between the respective ports without dead volume. See, e.g., the connecting elements 210*b* connecting the ports 0 and 3 without a dead volume and the connecting element 210*c* connecting the ports 4 and 5 without a dead volume. Furthermore (although not depicted in FIG. 1), this is also possible for connecting element 210*a*, which may also be dimensioned in such a way to allow for a dead volume free connection of the respective ports.

In other words, the switching valve 200 described above may be employed in a fluidic system 10 for fraction collection. It may be embedded inside an HPLC system, for example, to divert HPLC system flow into a waste reservoir

700, collection reservoirs 500, or a buffer section 400 (while the fluidic system 10 is still connected to the collection reservoirs 500) by switching at high speeds over the three work configurations/positions described above: a discharge configuration (FIG. 2B) (that may also be called a waste position), a collection configuration (FIG. 2C), and a buffer configuration (FIG. 2D) (that may also be called a flush position). Use of the buffer section 400 may thus enable an additional 'flush' step to be realized with the switching valve 200 as part of the fluidic system 10 as described above. The discharge configuration may be preferably located between the collection configuration and the buffer configuration. This may help to reduce carry-over. The placement of the switching valve 200 in the fluidic system 10 for these configurations is also depicted in FIG. 3 (discharge configuration), FIG. 4 (collection configuration), and FIG. 5 (buffer configuration).

Figure 3:
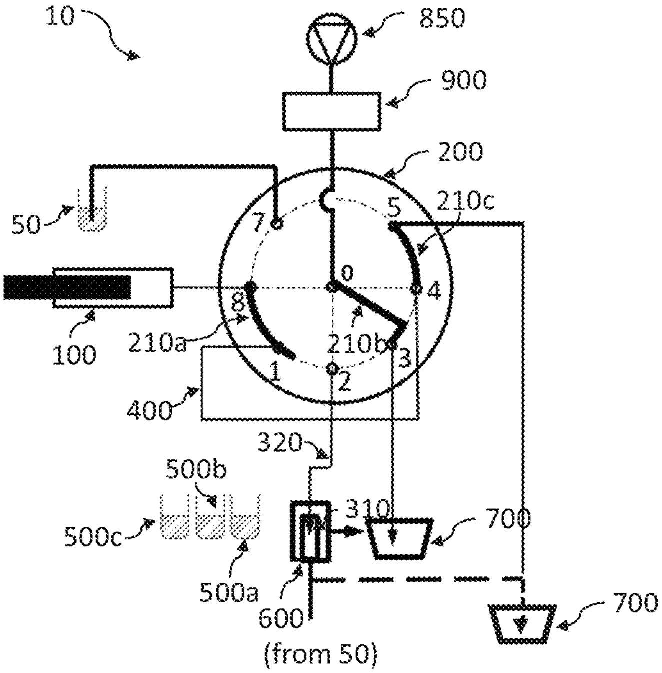
FIG. 3 depicts the fluidic system in a discharge configuration where eluates are being directed towards a waste reservoir.

FIG. 3 depicts a configuration of the fluidic system 10 where the switching valve 200 is in the discharge configuration described above. When comparing FIG. 3 to FIG. 1, the skilled person will understand that in FIG. 1, the port 5 is connected to the waste 700 to which also the port 3 is connected, while FIG. 3 depicts port 5 being connected to a waste 700, which is different from the waste 700 to which port 3 is connected. However, it should be understood that this is interchangeable, i.e., that also in FIG. 3, the port 5 could be connected to the waste 700 to which port 3 is connected (and the same also applies to the subsequent Figures). Furthermore, for sake of simplicity, the connection between the solvent reservoir 50 and the wash port 600 is depicted in a simplified manner in FIG. 3 and the subsequent Figures. As is depicted, e.g., in FIG. 3, the port 5 is connected to the waste 700. However, the line downstream of port 5 also has a junction upstream of the waste reservoir 700. Thus, the port 5 can not only be connected to the waste reservoir 700, but also to the wash port 600 (e.g., by means of a two way valve).

In this configuration, eluates from the detector 900 are discharged into the waste reservoir 700 while the pump 100 may be used to simultaneously fill up the buffer section 400 with a cleaning solvent that may have been drawn up from the solvent reservoir 50 in a previous step. More particularly, the pump 100 may cause a flow through port 8, port 1, buffer section 400, port 4 and port 5 towards the waste reservoir 700. However, as described, there may also be a valve (e.g., a two way valve) in the connection between the port 5 and the waste reservoir 700. By means of this valve, the fluid flow may also be directed towards the wash port 600 and to the waste reservoir which is also connected to port 3. Thus, the solvent flowing through the buffer section 400 may also be used to wash the wash port 600.

This may allow the buffer section 400 to be prepared for a subsequent step wherein a fraction eluted from the separation column upstream of the detector 900 may be collected into one of the collection reservoirs 500 via the buffer section 400.

Figure 4:
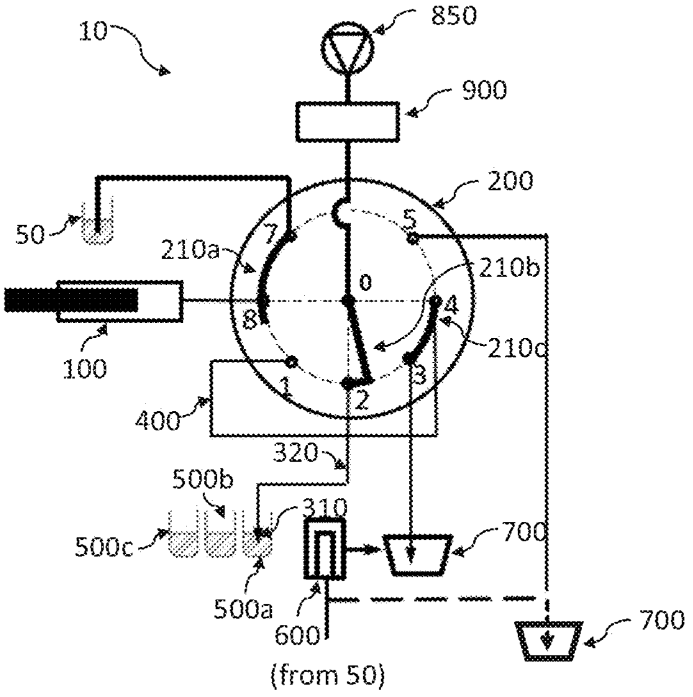
FIG. 4 depicts the fluidic system in a collection configuration where eluates are being collected in a collection reservoir.

FIG. 4 depicts the fluidic system 10 making use of the collection configuration of the switching valve 200 described above. In this configuration, the collection needle 310 may be moved from the wash section 600 to one of the collection reservoirs 500, for example, 500*a*, into which a fraction eluted from the separation column may be collected. Note that ports 7 and 8 may also be connected in this configuration which may allow filling up of the pump 100 with solvent from the solvent reservoir 50 after having been emptied, for example into the buffer section 400, in a previous step.

Figure 5:
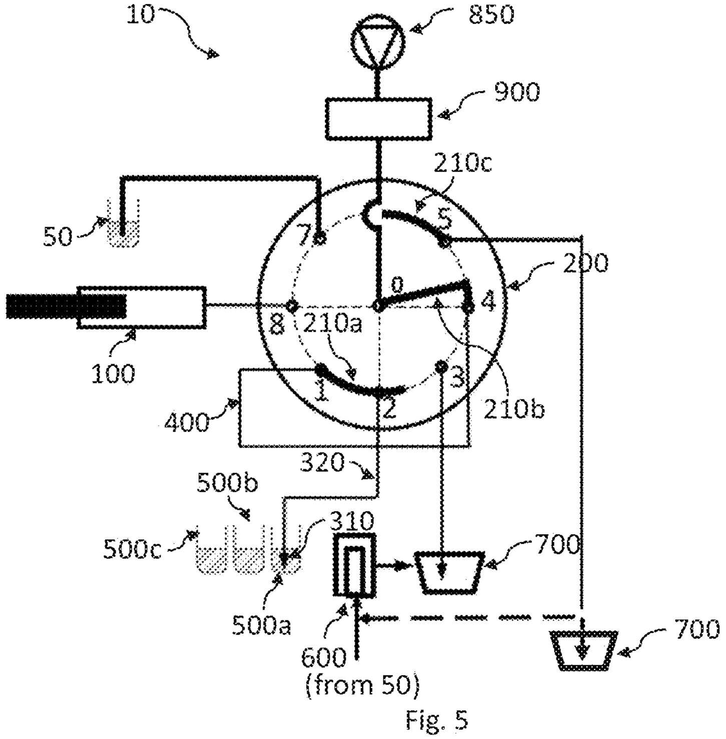
FIG. 5 depicts the fluidic system in a buffer configuration where a buffer section is brought into the fluid flow path.

FIG. 5 depicts the fluidic system 10 employing the buffer configuration of the switching valve 200 described above. This configuration may be employed when the fluidic system 10 is used for collection of fractions that are eluted relatively closely spaced in time. E.g., in order to avoid contamination of a first eluting fraction by the second eluting fraction, the buffer section 400 may be used to include a buffer separating different fractions. As depicted, in the configuration depicted in FIG. 5, the detector 900 is fluidly connected to the port 0, but there is no fluid connection between the detector 900 and the port 5. While this is depicted by the connection from the detector 900 to the port 0 comprising a curved section, those skilled in the art will understand that such a curved section is not a necessity, but that the connection between detector 900 and port 0 on the one hand, and the connection element 210*c* e the other hand, may also be located in different planes, i.e., these two elements may be offset from one another in the direction perpendicular to the drawing plane.

A typical workflow employing the fluidic system 10 as described above to collect two fractions will now be described with reference to FIGS. 6A to 12.

Figure 6A:
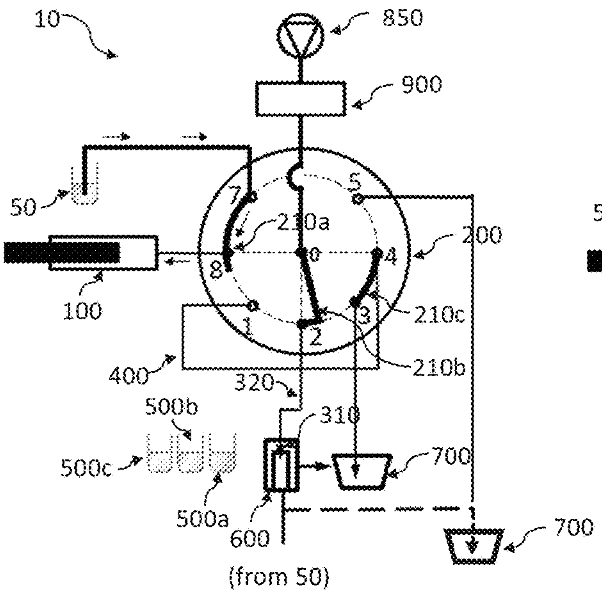
FIG. 6A depicts a solvent being drawn in by a pump in the fluidic system.
Figure 6B:
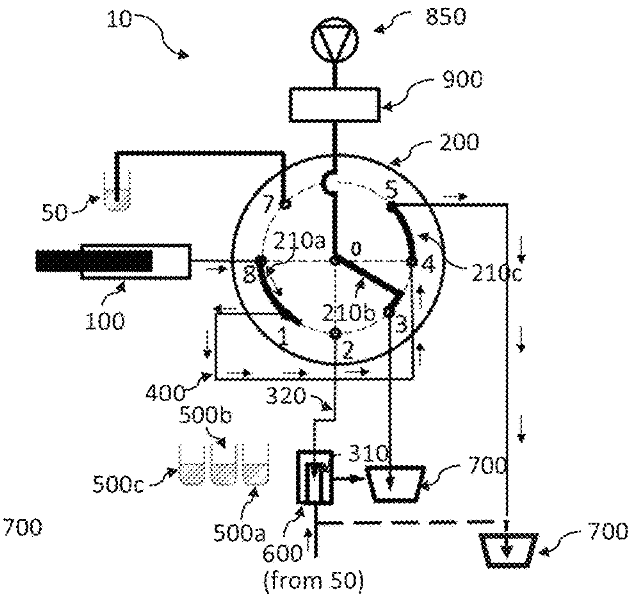
FIG. 6B depicts a preparation step of the fluidic system to prepare it for collection of a first fraction.

In a first preparation step, that may be carried out before the start of the separation, the fluidic system 10 may be used to wash the buffer section 400 and the collection needle 310 as shown in FIGS. 6A-6B. The switching valve 200 is rotated to the collection configuration depicted in FIG. 2*c*. In order to carry out the process of washing, a wash/cleaning solvent is drawn up into the pump 100 as shown in FIG. 6*a*. Here, the second connecting element 210*a* connects the ports 7 and 8 which allows for a flow of fluid from the solvent reservoir 50 into the pump 100. The pump 100 may comprise a piston and housing, and drawing the solvent may comprise the piston being actuated to lower the pressure inside the pump 100. This is also depicted in FIG. 6A.

FIG. 6A further depicts the first connecting element 210*b* connecting the ports 0 and 2 of the switching valve 200. As a result, fluid ejected from the detector 900 into the inlet line flows into the wash section 600. Since this step may be performed before the start of the separation process, ejecta from the detector 900 may be absent or comprise only the solvent. The wash section 600 may also be configured to draw up solvent from the solvent reservoir 50 so that at the same time, the outside surface of the collection needle 310 may be washed. This may help remove traces of prior collected fractions from the outer surface of the collection needle 310.

Once solvent has been drawn up into the pump 100, it may be pushed into the buffer section 400. This is depicted in FIG. 6B. The switching valve 200 may be rotated by +45° from its position in FIG. 6B so that the second connecting element 210*a* now connects ports 1 and 8, the first connecting element 210*b* now connects ports 0 and 3, and the third connecting element 210*c* now connects ports 4 and 5. This corresponds to the discharge configuration depicted in FIG. 6B. A fluid flow path is established between the pump 100 and the buffer section 400 in this configuration, with the other port of the buffer section 400 connected to the waste reservoir 700. The solvent drawn up into the pump 100 in the previous step may now be pushed into the buffer section 400. The ejecta from the detector 900 may be directed into the waste reservoir 700 in this configuration.

The volume of the pump 100 may be chosen to be large enough that the buffer section 400 is reliably filled with the solvent at the end of the pumping process described above.

Alternatively, if the volume of the pump 100 is not large enough, the above steps of sucking solvent in and pushing it into the buffer section 400 may be repeated until the buffer section 400 is completely filled with the solvent.

The filling up of the buffer section 400 may be followed by the pump 100 filling up solvent from the solvent reservoir 50 to be used in a subsequent flushing process. This may help increase the efficiency of the collection process and may be of interest when a plurality of closely spaced fractions may have to be collected. Additionally, the process of cleaning and filling up the buffer section 400 and filling up the pump 100 as described above may be repeated after collecting each fraction. This may also help to avoid contamination of any of the fractions with components from any other fraction.

As FIGS. 6A-6B further depict, the collection needle 310 may be kept in the wash section 600 for the entire process of preparing the fluidic system 10 for fractionation. The fluidic system 10 may now be used for collection of a first fraction, as depicted in FIGS. 7A-7B.

In other words, the steps depicted in FIGS. 6A-6B may be summarized as filling up the pump 100 and buffer section 400 with cleaning/wash solvent, and washing the outer surface of the collection needle 310 at the same time. The steps may comprise sucking in solvent into the cavity of the pump 100 and filling up the inner cavity of the pump 100 with the cleaning/wash solvent. At the same time, the buffer section 400 may be filled up with cleaning/wash solvent, too. This may comprise dispensing out liquid into the waste reservoir 700 and filling up the buffer section 400. Note that the above steps may also be repeated several times to fill up the solvent inlet tube (which connects the solvent reservoir 50 to the pump 100) to complete the pump priming task. Meanwhile, the outside surface of the collection needle 310 may also be washed. Once this is done, the pump 100 is ready for a subsequent buffer section wash function. This process of filling up the pump 100 may be carried out each time before washing the buffer section 400 when the buffer section is used to enable fraction collection.

Figure 7A:
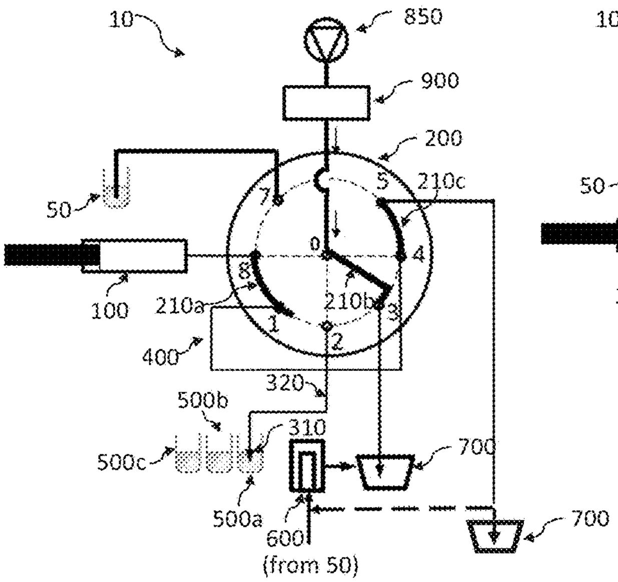
FIG. 7A depicts arrival of the first fraction into a detector upstream of the fluidic system.
Figure 7B:
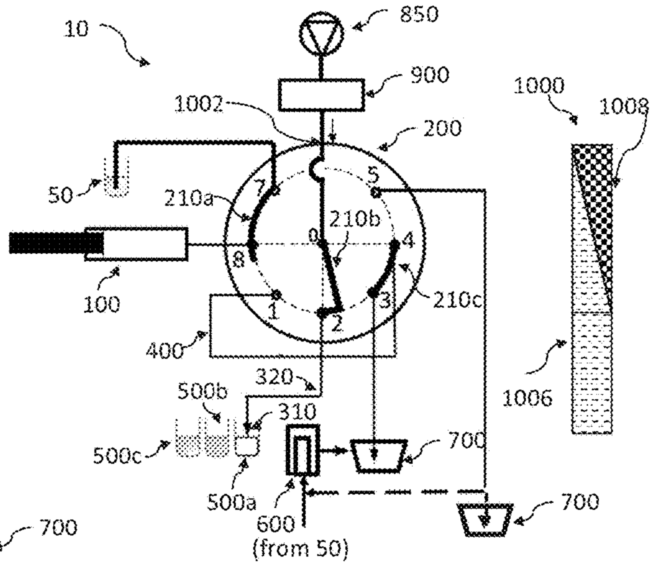
FIG. 7B depicts collection of the first fraction into a first collection reservoir using the fluidic system.

FIG. 7A shows the fluidic system 10 in a fraction collection mode. The switching valve 200 may stay in the discharge configuration until the first fraction that is to be collected, depicted as straight black arrows, is detected in the detector 900 and triggers a movement of the collection needle 310 from the wash section 600 into one of the plurality of collection reservoirs 500, for e.g., into a first collection reservoir 500*a*. Further, a switching of the switching valve 200 may also be triggered. The switching valve 200 may be switched to the collection configuration depicted in FIG. 2C, such that a flow is established between the ports 0 and 2, allowing collection of the first fraction into the collection reservoir 500*a*, as depicted in FIG. 7B. Note that an accurate estimation of the time required for any fraction to flow from the detector 900 to the collection needle 310 may be of particular advantage in the process described above.

The positioning of ports on the switching valve 200 such that the collection configuration of the switching valve 200 is between its discharge and buffer configurations may allow for rapid switching from the discharge configuration to the collection configuration by simply rotating the rotor of the switching valve by 45°. The pump 100 may not be operated while a fraction is being collected with the switching valve 200 in the collection configuration. This may involve, for example, no actuation of a piston of the pump 100 in case the pump 100 comprises a piston. The collection of the first fraction is continued until a second fraction that may be collected arrives at the detector 900.

The fluidic system 10 may now be switched to a buffer configuration. As regards an explanation for a function of the buffer configuration, reference may again be made to FIG. 7B. On the right of this Figure, an exemplary sample composition chart is depicted as 1000. 1000 depicts the sample composition between a point 1002 and the collection needle 310 (see FIG. 7*b*). In this chart, the vertical axis relates to the position between point 1002 (corresponding to the top of the chart) and the collection needle 310 (corresponding to the bottom of the chart). Perpendicular thereto, the sample composition is depicted, wherein at the bottom of the chart (corresponding to collection needle 310), 100% of a first sample constituent is present and at the top of the chart (corresponding to the point 1002), 100% of a second sample constituent is present, and the sample constitution changes gradually from an intermediary point (corresponding to port 2) and the top of the chart. That is, at a certain point of time, such a sample composition may be present in the fluidic system 10 where 100% of the second sample is present at point 1002 and decreasing to about 0% at the intermediary point at port 2. That is, at port 2 (and downstream therefrom), 100% of a first sample constituent 1006 may be present and at a point 1002 (and upstream therefrom), 100% of a second sample constituent 1008 may be present. However, between the point 1002 and the port 2, the sample composition may gradually change between these sample constituents.

Again with reference to FIG. 7B, when collecting a fraction up to the point of time of FIG. 7B, only the first sample constituent 1006 will be collected in the first collection reservoir 500*a*. However, if the system was continued to be operated in this configuration, the second sample constituent 1008 would also be collected in the first collection reservoir 500*a*, which may be undesirable.

However, if directly switching the system to collect the sample in another collection reservoir (e.g., in the second collection reservoir 500*b*), one would also collect mixed sample constituents.

The above steps depicted in FIGS. 7A and 7B may thus be summarized as follows. The collection needle 310 may be moved to a first collection reservoir 500*a*. The fluidic system 10 may stay idle in a discharge configuration until a first target fraction arrives. When the collection time window starts, the switching valve 200 may be switched to the collection configuration for collection of the first fraction into the first collection reservoir 500*a* till a second target fraction comes. The first target fraction is dispensed into the first collection reservoir 500*a* through the collection tube 320 and the collection needle 310. At this time, the pump 100 is 'off', i.e., switched to zero flow, with no actuation of a piston, for example.

Figure 8A:
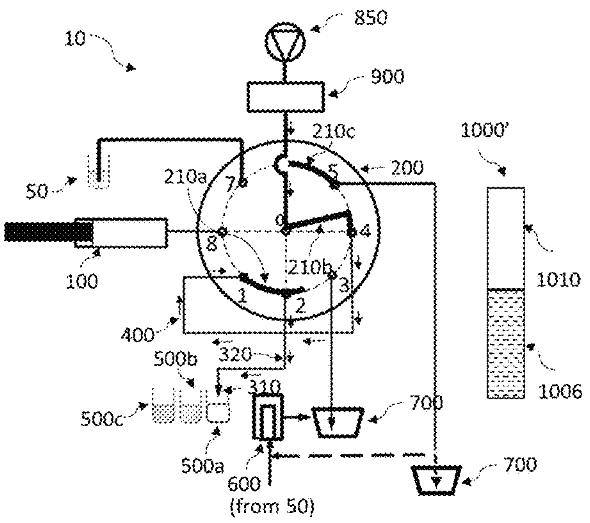
FIG. 8A depicts arrival of a second fraction into the detector.
Figure 8B:
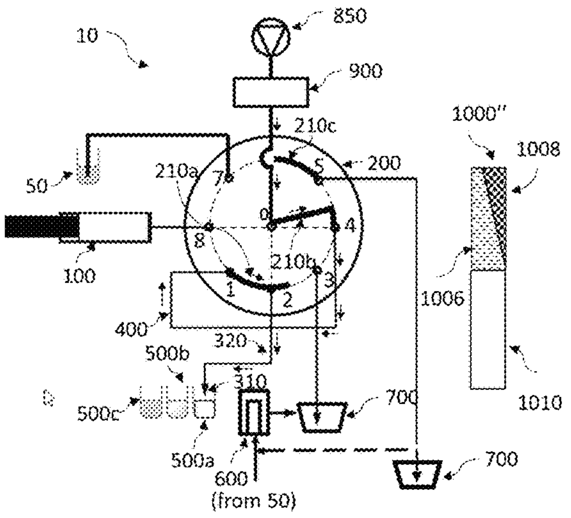
FIG. 8B depicts the fluidic system in the buffer configuration with the first fraction now being pushed through the buffer section before collection.

E.g., to avoid this, the system 10 may be switched to the buffer configuration depicted in FIG. 8A. Thus, the solvent in the buffer section may be used as a separator separating the pure component 1006 (which, at the time of switching is present at the port 2 and downstream therefrom) from the mixture of components 1006 and 1008. Thus, the pure component 1006 present in this section may still be forced into the first collection reservoir 500*a* in this configuration, without there being a risk of component 1008 also being collected in this collection reservoir 1008 (as there is now buffer solvent 1010 upstream of the component 1006).

Again, this is further depicted by illustration 1000' in FIG. 8A depicting the solvents and sample present between port 4 and the collection device 300 in the configuration depicted in FIG. 8A. Notably, between port 2 and the collection device 300, the sample constituent 1006 is present and upstream thereof between the port 4 and the port 2, buffer solution 1010 is present. When continuing to operate the system in this configuration, the sample constituent 1006 will be further collected into the reservoir 500*a*, until the buffer solution arrives at the collection device 300—see FIG. 8B, and here the illustration 1000" corresponding to illustration 1000'. That is, in this configuration, in a section upstream of the collection 300, the buffer solution will be present and further upstream the section containing a mix of 1006 and 1008 is present.

Figure 9:
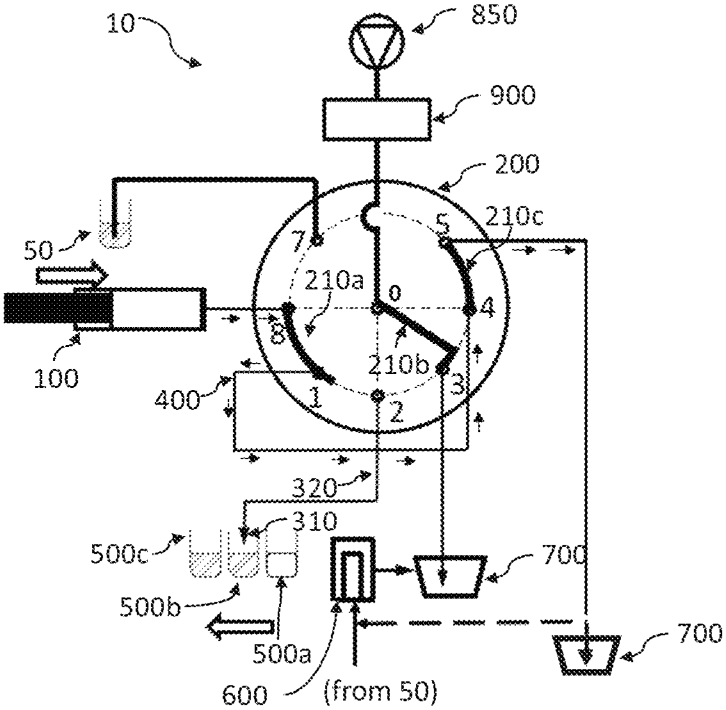
FIG. 9 depicts a washing of the buffer section to prepare it for subsequent collections.

The system can then be switched to the configuration depicted in FIG. 9 allowing the mixed section to be rinsed out of the system to arrive at a state where pure sample component 1008 is present at port 3 (and upstream therefrom). One can then switch the system to the configuration depicted in FIG. 10 to collect the sample component 1008 in a second collection reservoir 500*b*. In this regard, it is also possible that prior to assuming the exact configuration depicted in FIG. 10, the collection device 300 is positioned in wash section 600, as this may allow the buffer solution initially present between port 2 and collection device 300 be expelled. That is, such a configuration may be assumed until the pure sample component 1008 is present at the collection device 300 (and upstream therefrom), and the system may then be switched to the configuration depicted in FIG. 10, such that the pure sample component 1008 may be collected in collection reservoir 500*b*, as depicted in FIG. 9.

In other words, starting with the configuration depicted in FIG. 7B, the system 10 may be switched to the configuration depicted in FIG. 8A to switch the buffer section 400 in line. More particularly, the switching valve 200 may be rotated by +90° such that it attains its buffer configuration depicted in FIG. 2D. This may allow the buffer section 400 to be introduced into the flow path such that the first fraction that may still be flowing out of the inlet line into the fluidic system 10 may be directed into the collection reservoir 500*a* via the buffer section 400. The buffer section 400 may have been filled with a cleaning/wash solvent in a previous step as described above so that the first fraction is not contaminated in flowing through the buffer section 400. An advantage of the buffer section 400 may be to prevent mixing of the first and second fractions that may be collected. This may be achieved as follows.

The switching valve 200 may be kept in its buffer configuration until all of the first fraction has been dispensed into the collection reservoir 500*a*. Once again, this time may have been determined with the aid of a peak duration for the first fraction and the time required for the peak to flow down to the collection needle 310, including the volume of the buffer section 400. Note also that some part of the second fraction may flow into the buffer section 400 until the first fraction has been completely dispensed into the collection reservoir 500*a* (see illustration 1000" in FIG. 8B). Thus, at this time, the buffer section 400 may be filled up partially with the first fraction, the second fraction, and the solvent (mobile phase).

In other words, upon arrival of the second fraction the switching valve 200 switches to a buffer section configuration and continues collecting the first fraction via the buffer section 400. Namely, before the second target fraction flows into the collection tube 320, the switching valve 200 is switched to buffer configuration allowing the fluidic system 10 to keep pushing the remaining first target fraction inside the collection tube 320 and collection needle 310 through the pre-filled clean solvent inside the buffer section 400. The buffer section 400 is thus used to prevent mixing between the first and second target fractions. This configuration is maintained until all of the first target fraction is dispensed into the first collection reservoir 500*a*. At this time, the buffer section 400 may be almost filled up with the first fraction, the second fraction, and the solvent (mobile phase). The buffer configuration may help increase the recovery rate of the first target fraction. At the same time, the buffer section 400 may be used to prevent mixing between the first and second target fractions, thereby reducing carry over.

Once collection of the first fraction is complete, the switching valve 200 may be switched again, this time to its discharge configuration depicted in FIG. 2C. This brings the fluidic system 10 to the configuration depicted in FIG. 9.

The first connecting element 210*b* may now connect the ports 0 and 3, allowing some of the second fraction to flow into the waste reservoir 700. At the same time, the pump 100 may now be brought into fluidic connection with one port of the buffer section 400 while its other port may be connected to the waste reservoir 700. The buffer section 400 may now be cleaned of the mixture of solvent and first and second fraction that may be left over from the previous collection step by pushing the solvent stored in the pump 100. Clean solvent may flow into the buffer section 400 while the mixture of the first and second fraction and the solvent is pushed out into the waste reservoir 700. This may be achieved by actuation of a piston of the pump 100. Further, as FIG. 9 depicts, the collection needle 310 may be moved into a second collection reservoir, 500*b*, for example. This may prepare the fluidic system 10 for collection of the second fraction.

Figure 10:
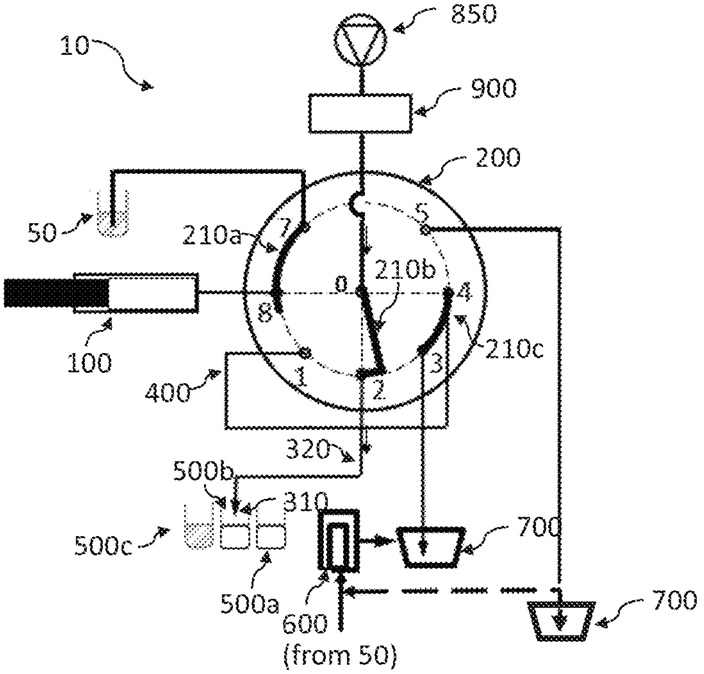
FIG. 10 depicts the collection of the second fraction into a second collection reservoir.

FIG. 10 depicts a configuration of the fluidic system 10 for collection of the second fraction into the second collection reservoir 500*b*. This configuration may be substantially similar to the one depicted in FIG. 7B for collection of the first fraction aside from the difference in collection reservoirs. The switching valve 200 may be switched back to the collection configuration depicted in FIG. 2C and the second fraction flows via the inlet line, the first connecting element 210*b*, and collection device 300 into the collection reservoir 500*b*. If a further third fraction is to be collected, the buffer section 400 may once again be connected into the flow path and used for collection without any mixing of fractions.

In other words, upon completion of collection of the first fraction through the buffer section 400 as described above, the switching valve 200 may switch to the discharge configuration with part of the second target fraction flowing into the waste reservoir 700. During this time, the pump 100 may be actuated to push the mixture of liquids inside the buffer section 400 into the waste reservoir 700 and refill it with clean solvent from the cavity of the pump 100. At the same time, the collection needle 310 may be moved to the next collection reservoir 500*b*. Then, the switching valve 200 may be switched back to the collection configuration to dispense the second fraction into the second collection reservoir 500*b* without any mixing and no carry over.

This may complete a circle of processes for fraction collection with the intermediate buffer configuration enabled.

Figure 11:
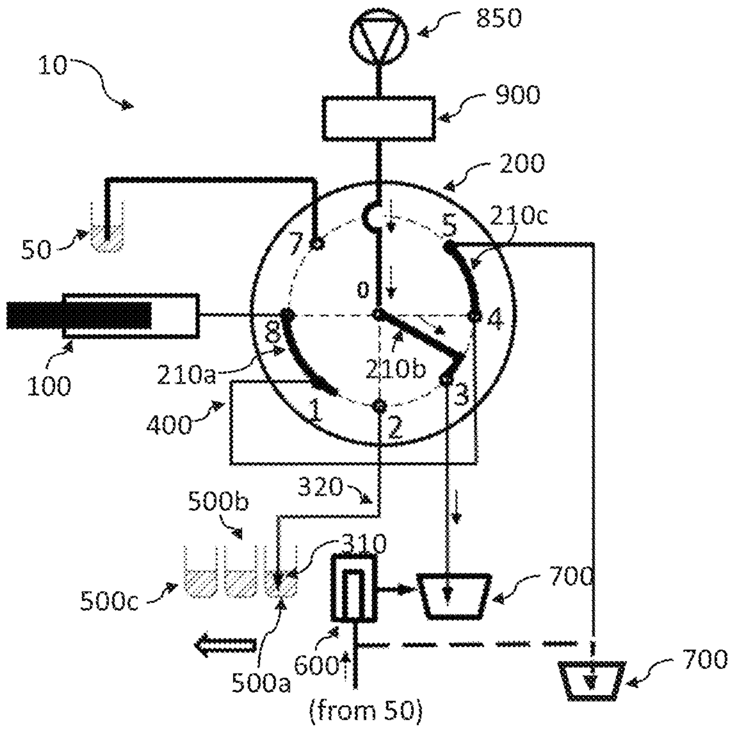
FIG. 11 depicts the switching of the fluidic system between collection of two fractions without using the buffer section.
Figure 12:
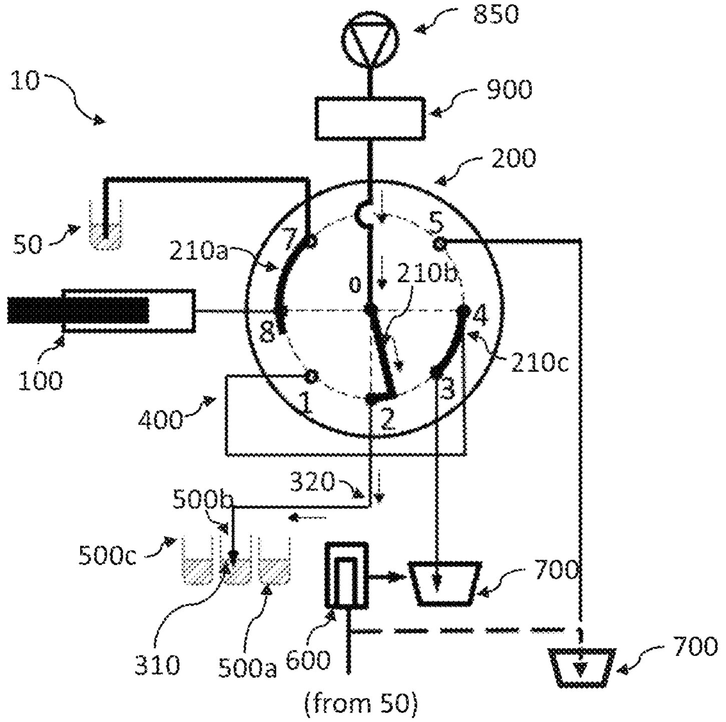
FIG. 12 depicts the collection of a second fraction without using a buffer section earlier.

FIGS. 11 and 12 depict alternate configurations of the fluidic system 10 described above, where switching of the collection reservoirs from 500*a* to 500*b* for collecting the second fraction may be achieved without an intermediate buffer configuration comprising washing of the buffer section 400. As depicted in FIG. 11, once the first fraction has been collected into the collection reservoir 500*a*, the switching valve 200 may be moved into a discharge configuration (see FIG. 2B), similar to the one depicted in FIG. 7A, but without the pump 100 being operated to push solvent into the buffer section 400. This may be followed by moving the collection needle 310 from the collection reservoir 500*a* to collection reservoir 500*b*.

Note that this is different from the process described above where partial collection of the first fraction was followed by switching the switching valve 200 to a buffer configuration which introduced the buffer section 400 into the flow path. This involved a rotation of the switching valve 200 by +900. It may be more efficient instead to skip the buffer configuration and rotate the switching valve 200 only by −45° to bring it to the collection configuration (see FIG. 2C).

Thus, as depicted in FIG. 12, once the connection needle 310 is housed in the collection reservoir 500*b*, the switching valve 200 is rotated to the collection configuration, that may bring the inlet line in direct connection with the collection device 300 such that the second fraction may flow into the collection reservoir 500*b*. Since the buffer section 400 is not used in this embodiment, the pump 100 may not need to be filled with a solvent or the buffer section 400 be washed prior to the collection process.

In other words, in the no buffer configuration, the pump 100 may be always held still. The fluidic system 10 triggers collection when the target fraction arrives. The switching valve 200 switches at a high speed over two configurations: the collection configuration (see FIG. 11) and the discharge configuration (see FIG. 12). This may comprise a no buffer configuration work flow.

Figure 13A:
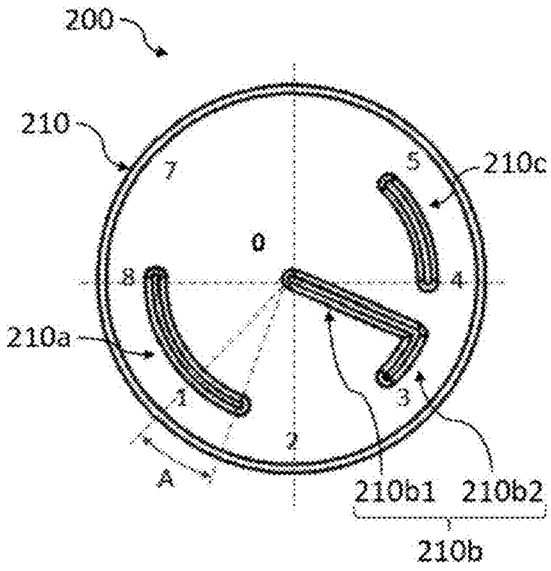
FIGS. 13A-13B depict ports and connecting elements on the switching valve.

However, carrying out the collection process using these configurations may involve significant amounts of both the first and second fractions flowing into the waste reservoir 700. This is because the collection of the first fraction may have to be terminated earlier and the switching valve 200 switched from a collection configuration to a discharge configuration depicted in FIG. 11 to avoid the second fraction from flowing into the reservoir 500*a*. Similarly, in order to reliably ensure that the second fraction flows into the reservoir 500*b* once the switching valve 200 is moved to the position depicted in FIG. 12, some amount of the second fraction may be allowed to flow out into the waste reservoir before switching the switching valve 200 back to the collection configuration. An advantage of the buffer section 400 as described above may be to allow this switching without significant amounts of either a first or second fraction being discharged into the waste reservoir 700. Exemplary embodiments of the switching valve 200 are depicted in FIGS. 13A to 15C. FIG. 13A depicts an exemplary embodiment of the rotor 210 of the switching valve 200. As described above, the rotor 210 may comprise the connecting elements 210*a*, 210*b*, and 210*c*, that may be realized as grooves. Connecting element 210*b* may be an L-shaped groove comprising a long section, 210*b*1, and a short section 210*b*2. The section 210*b*1 may also be referred to as radial section 210*b*1 and the section 201*b*2 may also be referred to as circumferential section 210*b*2. Connecting elements 210*a*, 210*c* may lie on either side of the groove 210*b*. The long section 210*b*1 may be substantially parallel to a radius of the switching valve 200, whereas the short section 210*b*2 may be substantially parallel to an arc of the switching valve 200. Connecting elements 210*a*, 210*c* may also be substantially parallel to arcs of the switching valve 200. The L-shape connecting element 210*b* and the groove marked as angle A may be particularly advantageous for continuous flow and reducing back pressure spike when the switching valve 200 switches from one configuration to the next.

Figure 13B:
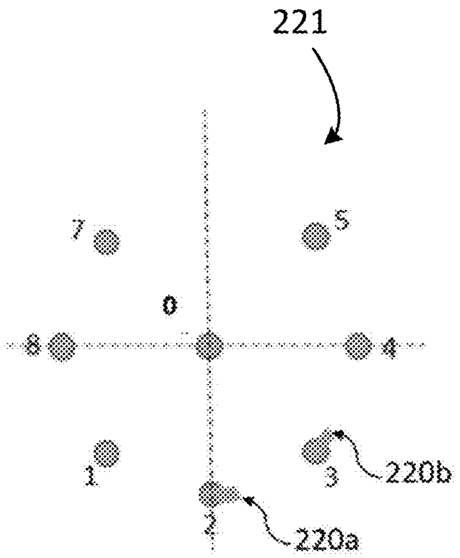

FIG. 13B depicts an exemplary embodiment of the arrangement of ports 0 to 8 on the stator 221 of the switching valve 200 that may be configured to cooperate with the rotor 210. The stator 221 may comprise the plurality of ports 0 to 8 that may be realized as holes or grooves on the stator 221. As depicted in FIG. 13B, the ports 1 to 8 may be arranged in a circle on the stator 221. Two small grey grooves 220*a*, 220*b*, connected to the second port 2 and the discharge port 3 respectively are also depicted. They may also be of advantage for continuous flow and reducing back pressure spike when the switching valve 200 switches from one configuration to the next as will now be described.

Figure 14A:
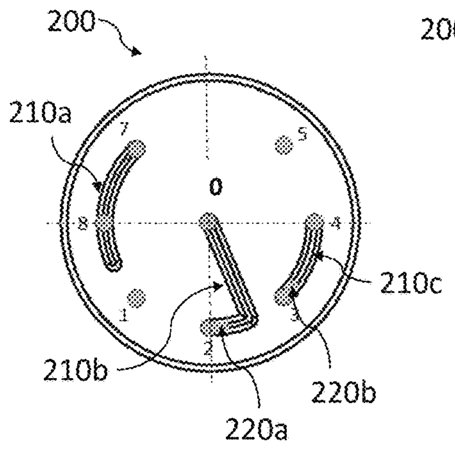
FIGS. 14A-14B depict fluidic connections as the switching valve is switched between the collection and discharge configurations.
Figure 14B:
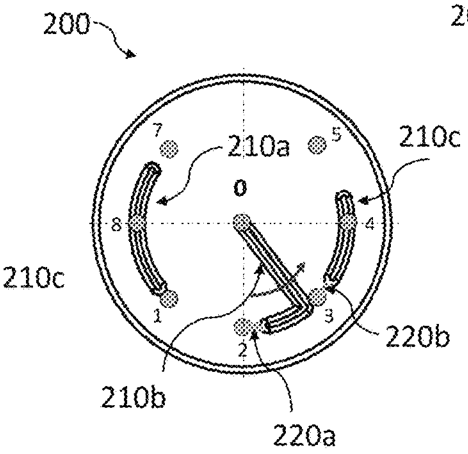
Figure 14C:
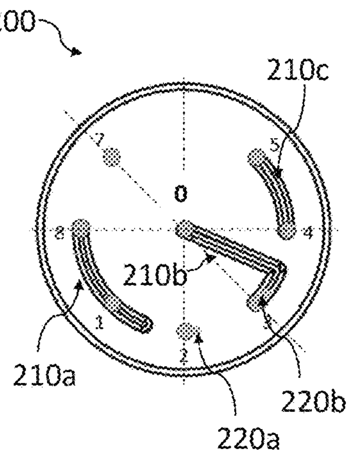

FIGS. 14A-14C depict an exemplary sequence of states (or connection status of grooves) of the switching valve 200 when it switches from the collection configuration (FIG. 14A) to the discharge configuration (FIG. 14C). As described above, ports 0 and 2 are fluidically connected to each other in the collection configuration, depicted in FIG. 14A, causing fractions eluted from a separation process upstream to be collected into a collection reservoir 500 connected to the second port 2. Then, in order to collect a second fraction, the fluidic system 10 may be switched to a discharge configuration depicted in FIG. 14C where the first port 0 and the discharge port 3 may be fluidically connected. This may involve rotating the rotor 210 anti-clockwise. As depicted in FIG. 14B, the flow from the first port 0 may always be fluidically connected with the second port 2 or the discharge port 3 during the anti-clockwise rotation of the rotor 210 from the collection configuration (FIG. 14A) to discharge configuration (FIG. 14C). Thus, the first port 0 is always fluidly connected to another port in this transition.

Thus, the flow from port 0 may not be blocked and may not introduce a spike in back pressure. This may be facilitated in particular by, for example, choosing a length of the groove on the second port 2 (depicted in FIG. 13B) such that the short section 210*b*2 of the connecting element 210*b* of the rotor 210 and the groove of the second port 2 may span a length of the rotor 210 between ports 2 and 3 as depicted in FIG. 14B. Thus, when the fluidic connection between ports 0 and 2 is broken off when switching between the collection configuration and the discharge configuration, a fluidic connection between ports 0 and 3 is established.

Figure 15A:
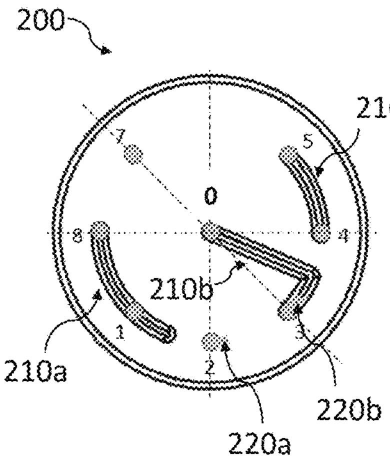
FIGS. 15A-15B depict fluidic connections as the switching valve is switched between the discharge and buffer configurations.
Figure 15B:
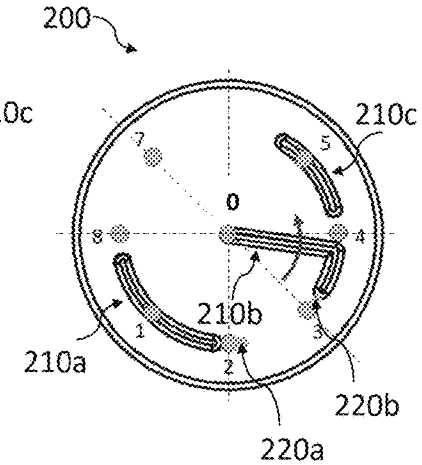
Figure 15C:
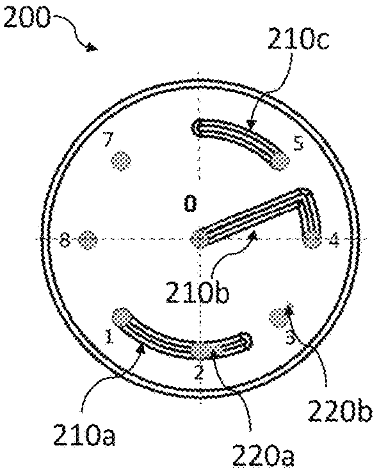

FIGS. 15A-15C depict an exemplary sequence of states (or connection status of grooves) of the switching valve 200 when it switches from the discharge configuration (FIG. 15A) to the buffer configuration (FIG. 15C). Similar to the switching depicted in FIGS. 14A-14C, the flow from the first port 0 may always be fluidically connected with the discharge port 3 or the third port 4 during the anti-clockwise rotation of the rotor 210 from the discharge configuration (FIG. 15A) to the buffer configuration (FIG. 15C). Thus, the flow from port 0 may not be blocked and may not introduce a spike in back pressure. Once again, this may be facilitated in particular by, for example, choosing a length of the groove on the discharge port 3 (depicted in FIG. 13B) such that the short section 210*b*2 of the connecting element 210*b* of the rotor 210 and the groove of the discharge port 3 may span a length of the rotor 210 between ports 3 and 4 as depicted in FIG. 15B. Thus, when the fluidic connection between ports 0 and 3 is broken off when switching between the discharge configuration and the buffer configuration, a fluidic connection between ports 0 and 4 is established.

It will be understood that the valve 200 described with reference to FIGS. 13A to 15C may be used in the system and method described with reference to FIGS. 1 to 12. However, the skilled person will understand that the valve 200 described with reference to FIGS. 13A to 15C may also be used independently from the system and method described with reference to FIGS. 1 to 12.

Overall, embodiments of the present technology thus allow collection of fractions efficiently, with a high recovery rate and less or almost no carry-over, especially for closely placed fractions/peaks and very small volume fraction collection by employing a buffer configuration (flushing out or dispensing remaining liquid inside the collection tube 320 and the collection needle 310 to improve recovery rate and reduce carry-over).

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that these embodiments were provided for illustrative purpose only and should by no means be construed to limit the scope of the present invention, which is defined by the claims.

The invention claimed is:

1. A fluidic system, comprising:

a switching valve comprising a plurality of ports that includes a first port, a second port, a third port, a fourth port, and a discharge port, wherein the switching valve is configured for connecting the ports in different configurations, the switching valve further comprising:

a stator, wherein the stator comprises the plurality of ports, a rotor, wherein the rotor comprises at least one connecting element for connecting the ports in the different configurations, wherein the at least one connecting element is at least one groove, wherein the rotor comprises a groove connected to the second port and extending between the second port and the discharge port, wherein the switching valve is configured to:

assume a collection configuration fluidly connecting the first port and the second port, assume a discharge configuration fluidly connecting the first port and the discharge port, and to transition from the collection configuration to the discharge configuration such that the first port is always connected to the second port or the discharge port during the transition;

an inlet line directly connected to the first port; and a collection device directly connected to the second port, wherein the fluidic system is configured to assume a collection configuration, wherein the first port and the second port are connected, wherein the fluidic system comprises a buffer section directly connected to the third port and the fourth port, and wherein the fluidic system is configured to assume a buffer configuration, wherein the first port and the third port are connected and the fourth port and the second port are connected.

2. The fluidic system according to claim 1, wherein the ports comprise a pump port directly connected to a pump and a waste port directly connected to waste, and wherein the fluidic system is configured to assume a buffer section wash configuration, wherein the pump port and the fourth port are connected and the third port and the waste port are connected.

3. The fluidic system according to claim 1, wherein the switching valve comprises a first connecting element for connecting the ports.

4. The fluidic system according to claim 3, wherein the first connecting element connects the first port and the second port in the collection configuration.

5. The fluidic system according to claim 1, wherein the fluidic system comprises a first collection reservoir, and wherein the fluidic system is configured to position the collection device to expel a fluid into the first collection reservoir.

6. The fluidic system according to claim 1, further comprising a second collection reservoir, and wherein the fluidic system is configured to position the collection device to expel a fluid into the second collection reservoir.

7. A computer program product comprising instructions configured to, when run on a control unit of a fluidic system having (1) a switching valve comprising a stator defining a plurality of ports that includes a first port, a second port, a third port, a fourth port, and a discharge port, a rotor having at least one connecting element for connecting the ports in different configurations, wherein the at least one connecting element is at least one groove, wherein the rotor comprises a groove connected to the second port and extending between the second port and the discharge port, (2) an inlet line directly connected to the first port, (3) a collection device directly connected to the second port, and (4) a buffer section directly connected to the third port and the fourth port, cause the fluidic system to perform a method, comprising:

configuring the switching valve to assume a collection configuration fluidly connecting the first port and the second port causing a fluid flow through the inlet line, the first port, the second port, and the collection device into a first collection reservoir;

configuring the switching valve to assume a discharge configuration fluidly connecting the first port and the discharge port;

configuring the switching valve to transition from the collection configuration to the discharge configuration such that the first port is always connected to the second port or the discharge port during the transition; and configuring the switching valve to assume a buffer configuration, wherein the first port and the third port are connected and the fourth port and the second port are connected.

8. A method of operating a fluidic system having (1) a switching valve comprising a stator defining a plurality of ports that includes a first port, a second port, a third port, a fourth port, and a discharge port, a rotor having at least one connecting element for connecting the ports in different configurations, wherein the at least one connecting element is at least one groove, wherein the rotor comprises a groove connected to the second port and extending between the second port and the discharge port, (2) an inlet line directly connected to the first port, (3) a collection device directly connected to the second port, and (4) a buffer section directly connected to the third port and the fourth port, the method comprising:

configuring the switching valve to assume a collection configuration fluidly connecting the first port and the second port causing a fluid flow through the inlet line, the first port, the second port, and the collection device into a first collection reservoir;

configuring the switching valve to assume a discharge configuration fluidly connecting the first port and the discharge port;

configuring the switching valve to transition from the collection configuration to the discharge configuration such that the first port is always connected to the second port or the discharge port during the transition; and configuring the switching valve to assume a buffer configuration, wherein the first port and the third port are connected and the fourth port and the second port are connected.

9. The method of claim 8, further comprising:

with the fluidic system assuming the buffer configuration, causing a second fluid flow flowing through the inlet line, the first port, the third port, the buffer section, the fourth port, the second port, and the collection device.

10. The method of claim 9, wherein the second fluid flow causes fluid to flow into the first collection reservoir.

11. The method of claim 9, wherein the ports of the fluidic system comprise a pump port directly connected to a pump and a waste port directly connected to waste and the fluidic system is configured to assume a buffer section wash configuration, wherein the pump port and the fourth port are connected and the third port and the waste port are connected, the method further comprising:

with the fluidic system assuming the buffer section wash configuration after the fluidic system assumes the buffer configuration, causing a washing flow through the pump port, the fourth port, the buffer section, the third port, the waste port, and towards the waste port.

12. The method of claim 11, wherein the fluidic system includes a second collection reservoir, and the fluidic system is configured to position the collection device to expel a fluid into the second collection reservoir, the method further comprising:

with the fluidic system again assuming the collection configuration after the fluidic system assumes the buffer section wash configuration, causing a fluid flow through the inlet line, the first port, the second port, and the collection device into the second collection reservoir.

* * * * *